(12) United States Patent
Laroia et al.

(10) Patent No.: US 8,451,961 B2
(45) Date of Patent: May 28, 2013

(54) METHOD OF REDUCING INTERFERENCE

(75) Inventors: Rajiv Laroia, Far Hills, NJ (US);
Sundeep Rangan, Jersey City, NJ (US);
Junyi Li, Bedminster, NJ (US); Thomas Richardson, South Orange, NJ (US);
Saurabh Tavildar, Jersey City, NJ (US)

(73) Assignee: QUALCOMM Incorporated, San Diego, CA (US)

(*) Notice: Subject to any disclaimer, the term of this patent is extended or adjusted under 35 U.S.C. 154(b) by 1575 days.

(21) Appl. No.: 11/944,197

(22) Filed: Nov. 21, 2007

(65) Prior Publication Data
US 2009/0129488 A1 May 21, 2009

(51) Int. Cl.
| H03D 1/04 | (2006.01) |
| H03D 1/06 | (2006.01) |
| H03K 5/01 | (2006.01) |
| H03K 6/04 | (2006.01) |
| H04B 1/10 | (2006.01) |
| H04L 1/00 | (2006.01) |
| H04L 25/08 | (2006.01) |
| H04L 27/26 | (2006.01) |

(52) U.S. Cl.
CPC ................................ H04L 27/2647 (2013.01)
USPC ........... 375/346; 375/285; 327/310; 327/384; 327/551; 455/296

(58) Field of Classification Search
None
See application file for complete search history.

(56) References Cited

U.S. PATENT DOCUMENTS

| 2003/0095498 | A1* | 5/2003 | Sato et al. ...................... 370/208 |
| 2004/0110508 | A1* | 6/2004 | Haartsen ........................ 455/445 |
| 2005/0147025 | A1* | 7/2005 | Auer .............................. 370/203 |
| 2006/0039495 | A1  | 2/2006 | Chae et al. |
| 2006/0220951 | A1* | 10/2006 | Thome et al. ................. 342/174 |
| 2007/0116099 | A1* | 5/2007 | Banister ........................ 375/148 |
| 2007/0242653 | A1* | 10/2007 | Yang et al. .................... 370/342 |
| 2009/0122775 | A1* | 5/2009 | Haartsen ....................... 370/338 |
| 2009/0135972 | A1* | 5/2009 | Tanaka et al. ................. 375/346 |

FOREIGN PATENT DOCUMENTS

| EP | 1608081 A2 | 12/2005 |
| WO | WO 2007049547 A1 * | 5/2007 |

OTHER PUBLICATIONS

"International Search Report and Written Opinion—PCT/US2008/083945, International Search Authority—European Patent Office—Jun. 16, 2009."
Tarokh V et al: "New detection schemes for transmit diversity with no channel estimation" Universal Personal Communications, 1998. ICUPC '98. IEEE 1998 International Conference on Florence, Italy Oct. 5-9, 1998, New York, NY, USA,IEEE, US, vol. 2, Oct. 5, 1998, pp. 917-920, XP010315028.
Taiwan Search Report—TW097145256—TIPO—Jan. 18, 2012.

* cited by examiner

*Primary Examiner* — Shuwang Liu
*Assistant Examiner* — Gina McKie
(74) *Attorney, Agent, or Firm* — Sam Talpalatsky; Nicholas J. Pauley; Joseph Agusta

(57) ABSTRACT

Various schemes for reducing effects of interference within communication systems are disclosed. A transmitter transmits a signal in a first time interval and a scrambled version of the signal in a second time interval, which does not overlap with the first time interval. A receiver receives a composite signal including a signal transmitted from the desired transmitter as well as signals from interferers in the first or the second time interval. The receiver determines a dominant interferer and obtains knowledge of signal scrambling done by the interferer as well as the desired transmitter by sensing an identification associated with the interferer or the desired transmitter. This knowledge is employed to determine coefficients for combining the received composite signals received in the first and the second time interval in order to recover the desired signal in a manner that maximizes the SNR associated with the desired signal or completely cancels the dominant interference.

72 Claims, 12 Drawing Sheets

402

404

METHOD OF REDUCING INTERFERENCE

BACKGROUND

Wireless communication systems are widely deployed to provide various types of communications such as voice, data, video and so on. These systems may be multiple-access systems capable of supporting communication with multiple access terminals by sharing the available system resources (e.g., bandwidth and transmit power). Examples of such multiple-access systems include code division multiple access (CDMA) systems, time division multiple access (TDMA) systems, frequency division multiple access (FDMA) systems, orthogonal frequency division multiple access (OFDMA) systems or hybrids involving at least two of these systems. Typically, a wireless communication system comprises several base stations, wherein each base station communicates with the mobile station using a forward link and each mobile station (or access terminal) communicates with base station using a reverse link.

With the advent of these wireless communication systems that facilitate varied communications, bandwidth demands as well as user volume has increased. Accordingly, information is transmitted at different rates depending on particular requirements which can vary from user to user. Furthermore, volume of users, multipath etc. are all causes for severe interference within communication systems. Therefore, managing interference within a communication system, e.g., a wireless communication system, is an important task in order to ensure link robustness and to achieve high system capacity. In particular, for cellular communication systems, a number of interference cancellation algorithms are currently in use, but they are generally implemented at a base station receiver. Therefore, they can be employed only in reverse link communications from a mobile terminal to a base station wherein the base station has the ability to process communications from different users simultaneously.

When investigating methods to reduce interference on forward links from the base station to mobile terminals, various factors need to be considered. This is because the environment of a mobile terminal can change constantly. As the terminal moves from place to place it encounters signals of varying strengths from different sources. Hence, no single static formula is effective to counter the interference from such varied sources as received by the mobile terminal. Moreover, it is likely that the mobile terminal will experience interference from a source that was never encountered earlier. As a result, it is difficult to plan ahead for mitigating interference effects at receivers within mobile terminals.

SUMMARY

The following presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later.

Various aspects described herein provide for reducing interference in communication systems. Composite signals including signals from at least two transmitters—at least one of which transmits a desired signal—are obtained at a receiver in at least two sets of bandwidths. In accordance with different aspects, the two sets of bandwidths for example can be two time durations or two frequency sub-bands. Preferably the two sets of bandwidths do not overlap with each other. The receiver identifies the desired transmitter that broadcasts the desired signal and the remaining transmitters are treated as interferers. The receiver also designates one or more interferers as dominant interferers and obtains identifications (IDs) associated with the desired transmitter and the dominant interferer(s). In one embodiment, the desired transmitter and the interferers broadcast their IDs and the receiver senses the IDs from the broadcast signal. In another embodiment, the receiver obtains all the IDs from the desired transmitter, e.g., by communicating with the desired transmitter. Accordingly the receiver determines coefficients associated with scrambling sequences used in the received signals from the desired transmitter as well as the dominant interferer(s). Based on values of the scrambling coefficients, the receiver determines coefficients to combine the signals from the desired transmitter and the other interferers in a manner that increases signal to interference ratio (SIR), increase signal power, or reduce interference power in order to recover the desired signal from the composite signals. In accordance with different aspects, the combining coefficients can be obtained by implementing a zero-force like scheme wherein the signal from the dominant interferer is canceled or more optimally by implementing a minimizing mean square error (MMSE) receiver wherein the SIR is maximized.

Another aspect relates to a method of operating a receiver for communicating with a first transmitter in a manner that minimizes interference at the receiver from a dominant interferer. The method comprises initially receiving a first and a second composite signals wherein each of the composite signals include signals transmitted from a first transmitter and from at least a second transmitter. The second transmitter is an interfering transmitter identified as a dominant interferer. A first and a second combining coefficients, or a first and a second sets of combining coefficients are obtained as functions of at least one of the first or second transmitters. These combining coefficients are utilized for combining the first and the second composite signals. The resultant combined signal is then employed to decode information transmitted from the first transmitter to the receiver.

In another aspect, a system that reduces interference within a receiver is disclosed. The system comprises a memory that stores a first and a second composite signals received from one or more transmitters. Each of the first and second composite signals comprise desired signals transmitted from a first transmitter and interfering signals from at least a second transmitter identified as a dominant interferer. A processor associated with the system identifies the dominant interferer and determines a first and a second combining coefficients as a function of at least one of the first or second transmitters. The processor further combines the first and the second composite signals using the first and the second combining coefficients to generate a combined signal which is then employed to decode information transmitted from the first transmitter.

Another aspect relates to a computer readable medium with instructions stored thereon for reducing interference within communication systems. They include instructions for receiving a first and a second composite signals each comprising desired signals transmitted from a first transmitter and interfering signals from at least a second transmitter. The medium includes instructions that identify the second transmitter as a dominant interferer. A first and a second combining coefficients for combining the first and the second composite signals to generate a combined signal are obtained as functions of at least one of the first or second transmitters.

Finally, the information transmitted from the first transmitter is decoded using the combined signal.

In yet another aspect, an apparatus for reducing interference is disclosed. It comprises among other elements, a means for storing a first and a second composite signals. Each of the first and second composite signals comprise desired signals transmitted from a first transmitter and interfering signals from at least a second transmitter identified as a dominant interferer. The apparatus further comprises a means for determining a first and a second identifications (IDs) associated with the signals transmitted from the first transmitter and the signals transmitted from the second transmitter respectively. A means for identifying also comprised within the apparatus identifies the dominant interferer. The identifying means also determines a first and a second combining coefficients as functions of the determined IDs, combines the first and the second composite signals using the first and the second combining coefficients to generate a combined signal and decodes information transmitted from the first transmitter using the combined signal.

Another aspect relates to a method of operating a transmitter for communicating with a first receiver in a traffic channel to reduce interference. The method involves partitioning the traffic channel into at least two non-overlapping sets of bandwidth resource. A first and a second scrambling coefficients are generated as functions of an identification that identifies a connection between the transmitter and the first receiver. An original signal is scrambled with the first and second scrambling coefficients respectively to generate a first and a second scrambled signals. These scrambled signals are transmitted in a first set and a second set of the at least two sets of bandwidth resource in accordance with this aspect.

In yet another aspect, a system for reducing interference in a traffic channel facilitating communication between a transmitter and a first receiver is disclosed. The system comprises a processor that generates a first and a second scrambling coefficients as functions of an identification which identifies connection between the transmitter and the first receiver. The processor utilizes the scrambling coefficients to generate a first and a second scrambled signals from an original signal by scrambling the original signal with the respective scrambling coefficients. The system further comprises one or more transmitting components that transmit the first and second scrambled signals respectively in a first one and a second one of two sets of bandwidth resources. In accordance with an aspect, the first and second one of the two sets of bandwidth resources are generated by partitioning the traffic channel into two or more sets of bandwidth.

A computer readable medium with instructions stored thereon for reducing interference within communication systems is disclosed in accordance with another aspect. The medium comprises instructions for partitioning a traffic resource into two or more non-overlapping sets that facilitate transmitting two or more signals. Further instructions facilitate generating a first and a second scrambling coefficients as functions of an identification that identifies a connection between the transmitter and a first receiver. An original signal is scrambled with the first and second scrambling coefficients to generate a first and a second scrambled signal respectively. The first and second scrambled signals are then respectively transmitted in the first and the second set of bandwidth resources in accordance with this aspect.

An apparatus for reducing interference in a traffic channel facilitating communication between a transmitter and a first receiver is disclosed in accordance with another aspect. The apparatus comprises a means for generating a first and a second scrambling coefficients as functions of an identification which identifies a connection between the transmitter and the first receiver. The generating means utilizes the scrambling coefficients to also generate respective first and a second scrambled signals from an original signal by scrambling the original signal with the first and second scrambling coefficients. Additionally, the apparatus can also comprise a means for communicating the first and second scrambled signals respectively in a first one and a second one of two sets of bandwidth resources. The first and second one of the two sets of bandwidth resources are generated by partitioning the traffic channel into the two or more sets of bandwidth.

The following description and the annexed drawings set forth in detail certain illustrative aspects of the claimed subject matter. These aspects are indicative, however, of but a few of the various ways in which the principles of the claimed subject matter may be employed and the claimed subject matter is intended to include all such aspects and their equivalents. Other advantages and distinguishing features of the claimed subject matter will become apparent from the following detailed description of the claimed subject matter when considered in conjunction with the drawings.

DETAILED DESCRIPTION

Figure 1:
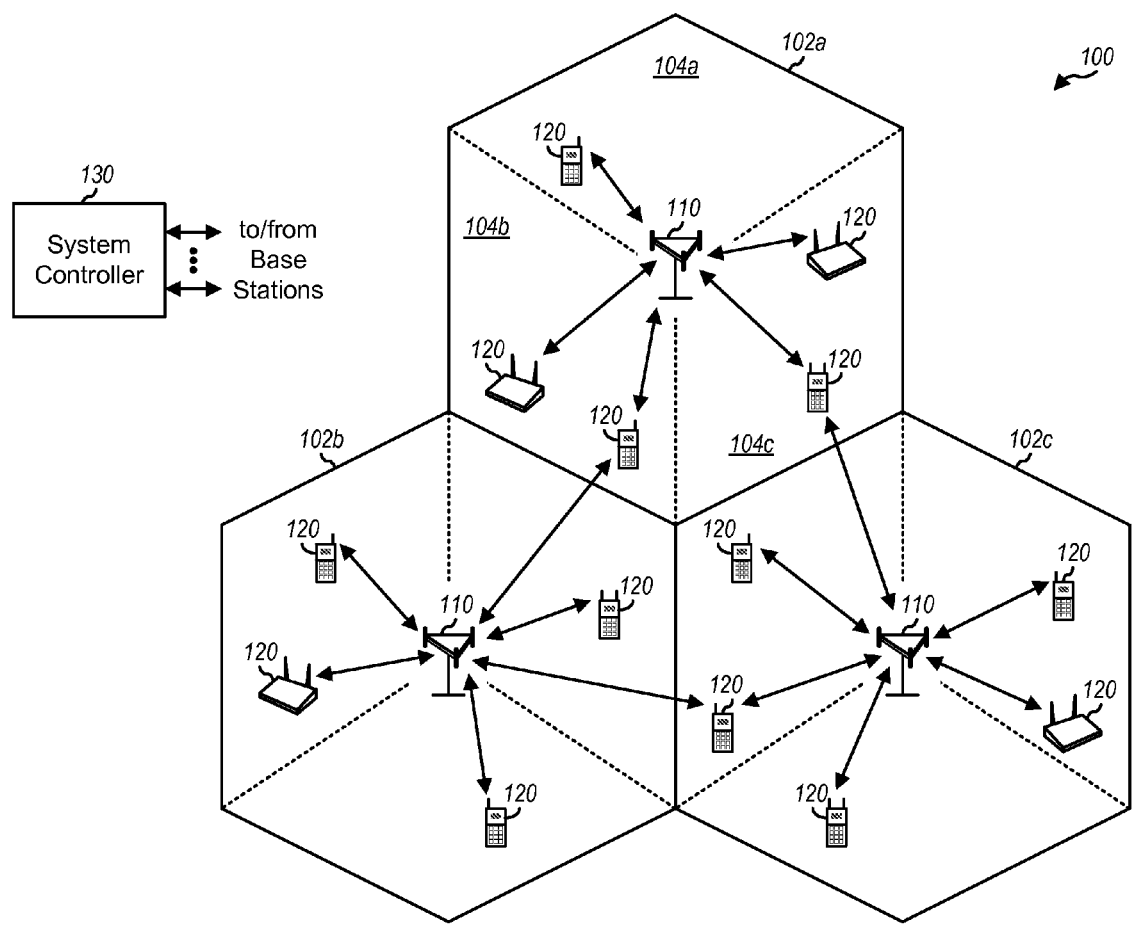
FIG. 1 illustrates a wireless multiple-access communication system in accordance with various aspects set forth herein.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

Various embodiments are now described with reference to the drawings, wherein like reference numerals are used to refer to like elements throughout. In the following description, for purposes of explanation, numerous specific details are set forth in order to provide a thorough understanding of one or more aspects. It may be evident however, that such embodiment(s) may be practiced without these specific details. In other instances, well-known structures and devices are shown in block diagram form in order to facilitate describing one or more embodiments. As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an integrated circuit, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a wireless terminal and/or a base station. A wireless terminal may refer to a device providing voice and/or data connectivity to a user. A wireless terminal may be connected to a computing device such as a laptop computer or desktop computer, or it may be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment. A wireless terminal may be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point) may refer to a device in an access network that communicates over the air-interface, through one or more sectors, with wireless terminals. The base station may act as a router between the wireless terminal and the rest of the access network, which may include an Internet Protocol (IP) network, by converting received air-interface frames to IP packets. The base station also coordinates management of attributes for the air interface. Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

Various embodiments will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The word "exemplary" is used herein to mean "serving as an example, instance, or illustration." Any embodiment or design described herein as "exemplary" is not necessarily to be construed as preferred or advantageous over other embodiments or designs. The word "listening" is used herein to mean that a recipient device (access point or access terminal) is receiving and processing data received on a given channel.

FIG. 1 shows a wireless communication system 100 with multiple access points (APs) 110 and multiple terminals 120. A base station is a station that communicates with the terminals. A base station may also be called, and may contain some or all of the functionality of, an access point, a Node B, and/or some other network entity. Each access point 110 provides communication coverage for a particular geographic area 102. The term "cell" can refer to an access point and/or its coverage area depending on the context in which the term is used. To improve system capacity, an access terminal coverage area may be partitioned into multiple smaller areas, e.g., three smaller areas 104a, 104b, and 104c. Each smaller area is served by a respective base transceiver subsystem (BTS). The term "sector" can refer to an AP and/or its coverage area depending on the context in which the term is used. For a sectorized cell, the APs for all sectors of that cell are typically co-located within the base station for the cell. The signaling transmission techniques described herein may be used for a system with sectorized cells as well as a system with un-sectorized cells. For simplicity, in the following description, the term "base station" is used generically for a station that serves a sector as well as a station that serves a cell.

Terminals 120 are typically dispersed throughout the system, and each terminal may be fixed or mobile. A terminal may also be called, and may contain some or all of the functionality of, a mobile station, a user equipment, and/or some other device. A terminal may be a wireless device, a cellular phone, a personal digital assistant (PDA), a wireless modem card, and so on. A terminal may communicate with zero, one, or multiple base stations on the forward and reverse links at any given moment.

For a centralized architecture, a system controller 130 couples to APs 110 and provides coordination and control for these base stations. System controller 130 may be a single network entity or a collection of network entities. For a distributed architecture, the APs may communicate with one another as needed.

In some aspects, the system may support multiple protocols such as CDMA and OFDMA, which may be used alternately for both RL and FL transmission, or for only one or the other. In addition, in OFDMA communication system one or more ATs may support a CDMA reverse link, along with or in lieu of an OFDM reverse link.

Figure 2:
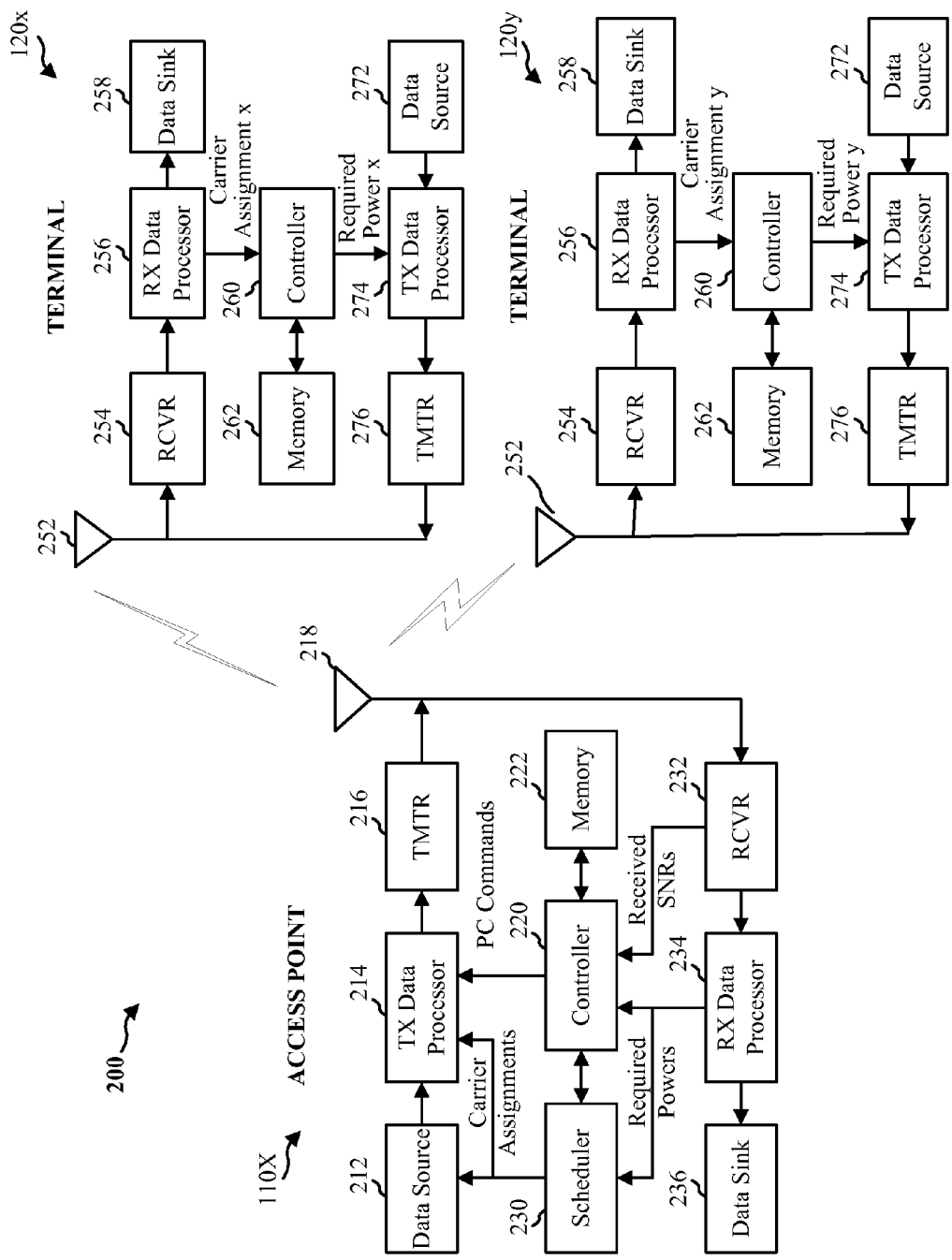
FIG. 2 illustrates a block diagram of an embodiment of an AP and two ATs in a multiple-access multi-carrier communication system.

FIG. 2 shows a block diagram 200 of an embodiment of an AP 110x and two ATs 120x and 120y in multiple-access multi-carrier communication system 100. At AP 110x, a transmit (TX) data processor 214 receives traffic data (e.g., information bits) from a data source 212 and signaling and other information from a controller 220 and a scheduler 230.

For example, controller 220 may provide power control (PC) commands that are used to adjust transmit power of active ATs, and scheduler 230 may provide assignments of carriers for the ATs. These various types of data may be sent on different transport channels. TX data processor 214 encodes and modulates the received data using multi-carrier modulation (e.g., OFDM) to provide modulated data (e.g., OFDM symbols). A transmitter unit (TMTR) 216 then processes the modulated data to generate a downlink modulated signal that is then transmitted from an antenna 218. Additionally, memory 222 can maintain information regarding current or previous assignments and/or power levels.

At each of ATs 120x and 120y, the transmitted and modulated signal is received by an antenna 252 and provided to a receiver unit (RCVR) 254. Receiver unit 254 processes and digitizes the received signal to provide samples. A received (RX) data processor 256 then demodulates and decodes the samples to provide decoded data, which may include recovered traffic data, messages, signaling, and so on. The traffic data may be provided to a data sink 258, and the carrier assignment and PC commands sent for the terminal are provided to a controller 260. Memory 262 can be used to store the received maps and other information facilitating operation of the terminal. Controller 260 directs data transmission on the uplink using resources that have been assigned to the terminal and indicated in the received assignment.

Controller 220 directs data transmission on the downlink using resources that have been assigned to the terminal. Controller 220 further injects erasure signature packets when there is no actual data to transmit, yet desires to keep the assigned resources.

For each active terminal 120, a TX data processor 274 receives traffic data from a data source 272 and signaling and other information from controller 260. For example, controller 260 may provide information indicative of channel quality information, required transmit power, the maximum transmit power, or the difference between the maximum and required transmit powers for the terminal. The various types of data are coded and modulated by TX data processor 274 using the assigned carriers and further processed by a transmitter unit 276 to generate an uplink modulated signal that is then transmitted from antenna 252.

At AP 110x, the transmitted and modulated signals from the ATs are received by antenna 218, processed by a receiver unit 232, and demodulated and decoded by an RX data processor 234. The decoded signals can be provided to a data sink 236. Receiver unit 232 may estimate the received signal quality (e.g., the received signal-to-noise ratio (SNR)) for each terminal and provide this information to controller 220. Controller 220 may then derive the PC commands for each terminal such that the received signal quality for the terminal is maintained within an acceptable range. RX data processor 234 provides the recovered feedback information (e.g., the required transmit power) for each terminal to controller 220 and scheduler 230.

Scheduler 230 may provide an indication to controller 220 to maintain the resources. This indication is provided if more data is scheduled to be transmitted. For the AT 120x, the controller 260 may determine if resources are required to be maintained. In certain aspects, controller 220 may perform instructions that provide the functionality of scheduler 230.

The methods and systems for communication described herein aid in reducing interference in ad-hoc networks. Different aspects can relate to either cancelling the interference (zero-force scheme) or manipulating the desired signal employing techniques like h (MMSE) such that the SNR of the received signal is maximized. Combining coefficients for a desired signal and a signal from a dominant interferer are determined based on respective IDs of the associated transmitters. Thus, they aid in generating a receiver that can be dynamically optimized based on the dominant interferers present in its environment.

Figure 3:
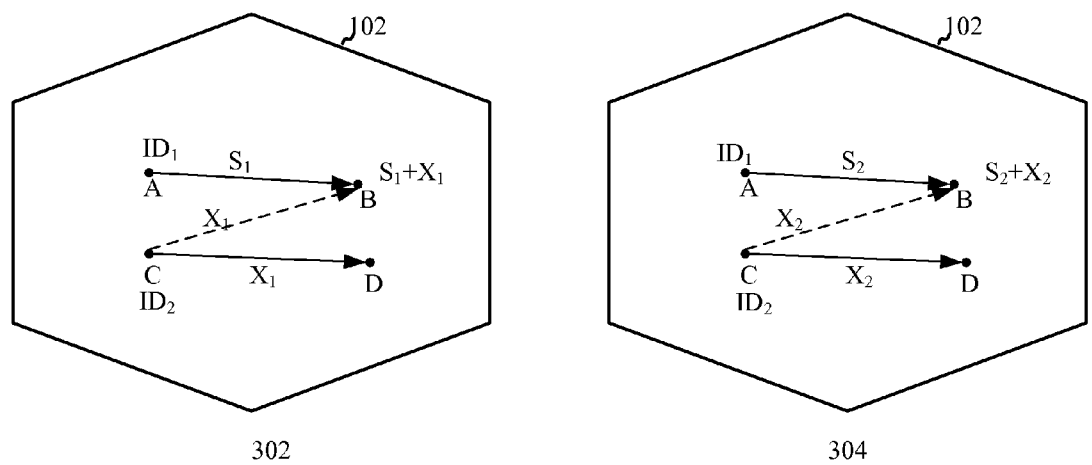
FIG. 3 illustrates a multiple access communication system comprising multiple transmitters as well as multiple receivers.

FIG. 3 illustrates a multiple access communication system comprising multiple transmitters at A, C, as well as multiple receivers at B and D. The transmitters/receivers can be combinations of base stations/access points and/or user/mobile terminals which can comprise transmitters and/or receivers in accordance with various aspects described herein. By way of illustration and not limitation, the system depicted in FIG. 3 is a more detailed illustration of a cell shown in FIG. 1. It is assumed that a transmitter at A comprising an identification $ID_1$ transmits a signal $S_1$ to B whereas a transmitter at C bearing an $ID_2$ transmits a signal $X_1$ to D. The signals may be FDMA, TDMA, CDMA, OFDM or combinations thereof. For a receiver at B, the signal from A is the desired signal whereas the signal from C would be an interfering signal. It is also assumed that for the receiver at B, transmitter at C is the dominant interferer. In other words, there could be other transmitters in the proximity that generate interference to receiver B. Accordingly, the composite signal received at B during a first time duration 302 would be:

$$y_1 = S_1 + X_1 + \text{noise} \quad (1)$$

Subsequently, A repeats the signal in the form of $S_2$ to B while C repeats signal $X_2$ to D during a second time duration 304. The second time duration may be equal to the first duration, however, the first and second time durations are non-overlapping. Accordingly, during the second transmission at 304, B receives a composite signal:

$$y_2 = S_2 + X_2 + \text{noise} \quad (2)$$

In accordance with various aspects, the signals $S_2$, $X_2$, can be related to signals $S_1$, $X_1$ respectively in a predetermined manner. According to further aspects, given a signal $S_1$, signal $S_2$ can be uniquely determined based on an ID of the transmitter and therefore, signal $S_2$ can be obtained as a function of $S_1$ and $ID_1$. Similarly, signal $X_2$ can be obtained as a function of $X_1$ and $ID_2$. For example, $S_2$, $X_2$ can be generated by phase-rotating $S_1$, $X_1$, respectively. The phase rotation between $S_1$ and $S_2$ can be a function of $ID_1$, the phase rotation between $X_1$ and $X_2$ can be a function of $ID_2$. In one embodiment, the two phase rotations are pseudo-randomly generated and statistically independent with each other. In accordance with further aspects, $S_1$, $S_2$ and $X_1$, $X_2$ can share time and/or frequency resources. Hence, the composite signals received at B can be linearly combined into:

$$y = \alpha y_1 + \beta y_2 = \alpha(S_1 + X_1) + \beta(S_2 + X_2) + \text{noise} \quad (3)$$

which may be rewritten as:

$$y = \alpha S_1 + \beta S_2 + \alpha X_1 + \beta X_2 + \text{noise} \quad (4)$$

wherein $\alpha S_1 + \beta S_2$ make up the signal component and $\alpha X_1 + \beta X_2$ comprises the interference component of the total signal y at the receiver B. The noise component is generally negligible in comparison to the interference component. Accordingly, SIR (signal-to-interference ratio) of the signal y at receiver B is:

$$\text{SIR of } y = (\alpha S_1 + \beta S_2)/(\alpha X_1 + \beta X_2) \quad (5)$$

As stated supra, various aspects address determining combining coefficients $\alpha$, $\beta$ such that the SIR of signal y is maximized, the signal strength is maximized, or the interference (from a dominant interferer) is completely canceled (zero-force scheme). For example, if interfering signals $X_1$, $X_2$ are significantly stronger than desired signals $S_1$, $S_2$ then combining coefficients α, β can be determined in a manner that mitigates the effect of the interfering signals and thereby enhances the SIR.

Figure 4:
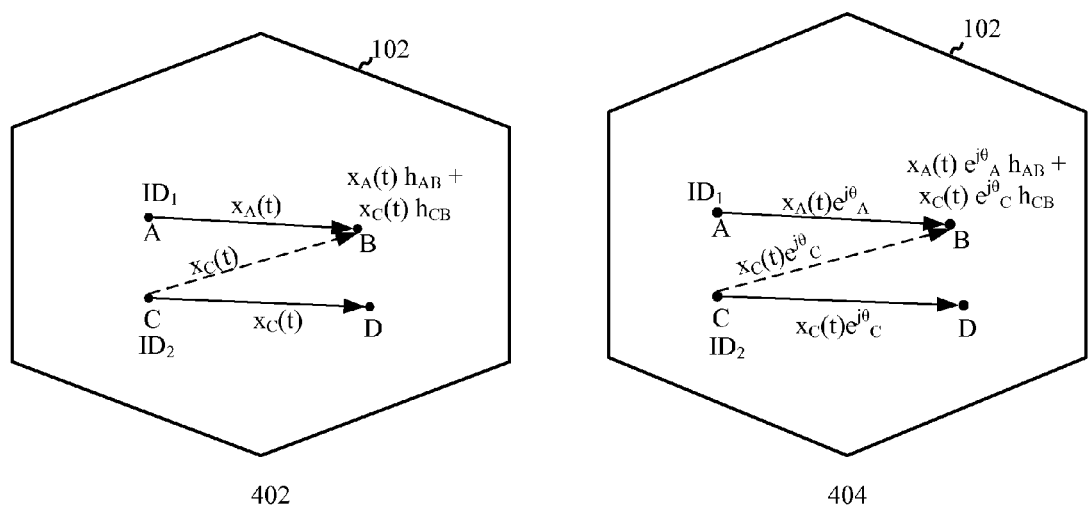
FIG. 4 illustrates a multiple access communication system comprising multiple transmitters as well as multiple receivers which mitigates the effects of interference in accordance with an aspect.

FIG. 4 illustrates a multiple access communication system comprising multiple transmitters A, C, as well as multiple receivers B and D which mitigates effects of interference in accordance with an aspect. Let the signal $S_1$ transmitted from A to B in the first time duration 402 be $x_A(t)$ and similarly signal $X_1$ transmitted from C to D in the first time duration be $x_C(t)$. As stated supra, the signals transmitted from transmitters at A, C to receivers at B, D during the first and second time durations can be related to each other in a predetermined manner. Accordingly, A and C can repeat phase-rotated versions $S_2$, $X_2$ of the signals $S_1$, $X_1$ respectively in the second time duration 404 such that $S_2 = x_A(t)e^{j\theta}A$ and $X_2 = x_C(t)e^{j\theta}$. Moreover, as mentioned above, the signals repeated in the second time duration can be functions of the signals in the first time duration and the IDs associated with respective transmitters A, C. In accordance with certain aspects, the IDs associated with the transmitters can be their MAC IDs (Media Access Control IDs). Thus, the IDs can be associated with connections between the transmitters A, C and their respective intended receivers B, D. Accordingly, the receiver at B can obtain knowledge of phase rotation of the transmitter at C via a broadcasted ID associated with the transmitter. This facilitates determining the combining coefficients such that they mitigate the effects of interference from C at B.

Suppose that the channel remains the same in the first and second time durations and $h_{AB}$, $h_{CB}$ denote channel gains from A to B and C to B respectively. As stated supra, the signals can be combined in a manner such that the interference is reduced and/or cancelled. The resultant composite signal at B during the first time duration is denoted by:

$$y_1 = S_1 + X_1 + \text{noise} = x_A(t)h_{AB} + x_C(t)h_{CB} + \text{noise} \quad (6)$$

Similarly the resultant composite signal at B during the second time duration can be denoted by:

$$y_2 = S_2 + X_2 = x_A(t)e^{j\theta}{}_A h_{AB} + x_C(t)e^{j\theta}{}_C h_{CB} + \text{noise} \quad (7)$$

In accordance with an aspect the signals transmitted by a particular transmitter, for example A, can be obtained from an original signal by multiplying it with a first complex coefficient and a second complex coefficient in the first and second time durations respectively. In the aforementioned example, the original signal can be $x_A(t)$ which is multiplied by 1 during the first time interval and $e^{j\theta}{}_A$ in the second time interval. The first and second complex coefficients are functions of transmitter and can also be functions of system time index corresponding to the original signal to be transmitted. The receiver at B determines the combining coefficients for the signals indicated by equations (6) and (7) such that the effect of interference is mitigated. Accordingly, B can combine the signals to obtain y as:

$$y = \alpha y_1 + \beta y_2 = \alpha[x_A(t)h_{AB} + x_C(t)h_{CB}] + \beta[x_A(t)e^{j\theta}{}_A h_{AB} + x_C(t)e^{j\theta}{}_C h_{CB}] + \text{noise} \quad (8)$$

Eq. (8) can be rewritten as:

$$y = \alpha x_A(t)h_{AB} + \beta x_A(t)e^{j\theta}{}_A h_{AB} + \alpha x_C(t)h_{CB} + \beta x_C(t)e^{j\theta}{}_C h_{CB} + N \quad (9)$$

wherein $\alpha x_A(t)h_{AB} + \beta x_A(t)e^{j\theta}{}_A h_{AB}$ forms the signal component and $\alpha x_C(t)h_{CB} + \beta x_C(t)e^{j\theta}{}_C h_{CB}$ forms the interference component while N is a negligible noise component. If the value of α is assumed to be 1 and β is assumed to be $-e^{-j\theta}{}_C$ the resultant combined signal would now be:

$$y = x_A(t)h_{AB} - e^{-j\theta}{}_C x_A(t)e^{j\theta}{}_A h_{AB} + x_C(t)h_{CB} - e^{-j\theta}{}_C x_C(t)e^{j\theta}{}_C h_{CB} + N \quad (10)$$

Eq. (10) can be rewritten as:

$$y = x_A(t)h_{AB}[1 - e^{j\theta}{}_A{}^{-\theta}{}_C] + N \quad (11)$$

Therefore, upon identifying a dominant interferer at C, the receiver at B determines the manner in which C affects phase change within its signals and thereby combines the desired signal with the interference signal in a manner which mitigates the effect of the interferer. While this procedure may cause some damage to the desired signal, for example, via noise enhancement, the benefits derived from reduced interference far outweigh the damage to the desired signal. The knowledge of phase rotation of the interferer may be obtained via various transmissions on common channels like paging or access channels etc. which are utilized to exchange messages before a communication link is set up.

Figure 5:
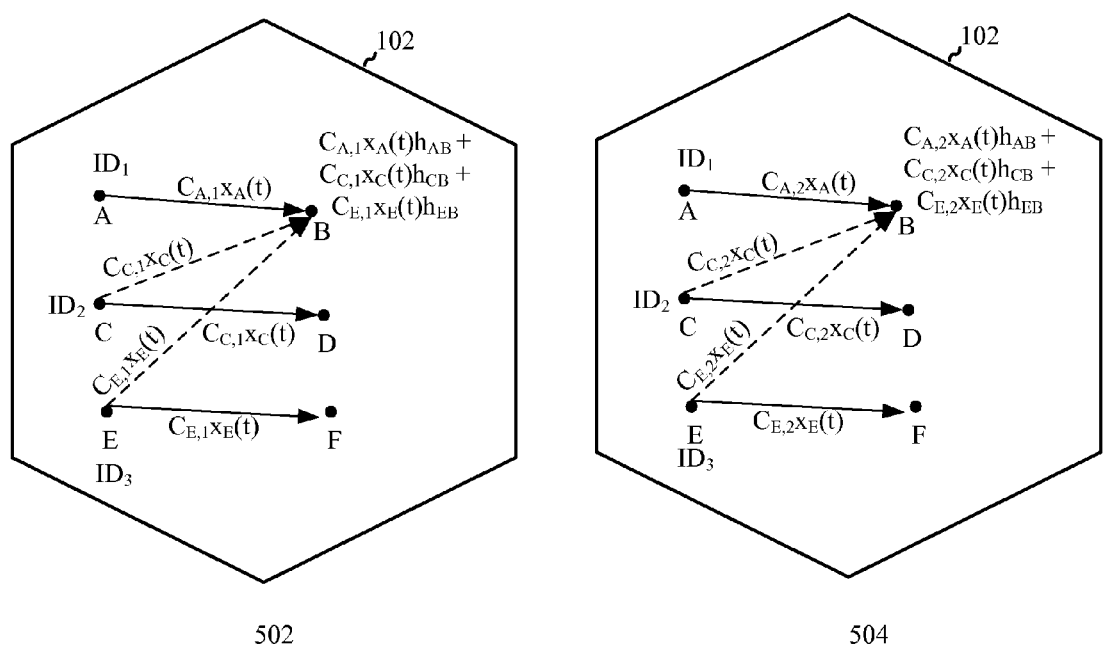
FIG. 5 illustrates another multiple access communication system which mitigates the effects of interference according to another aspect.

FIG. 5 illustrates another multiple access communication system which mitigates the effects of interference in accordance with an aspect. The system comprises multiple transmitters at A, C, E broadcasting respective IDs $ID_1$, $ID_2$, and $ID_3$. These transmitters send signals to multiple receivers at B, D and F. Let $x_A(t)$, $x_C(t)$, $x_E(t)$ be the original signals to be sent by transmitters A, C and E respectively. The original signals can be coded signals. As stated supra, the signals sent during the first time interval and second time interval can be obtained from the original signal in a predetermined manner by multiplying it with complex coefficients. Accordingly, in the first time interval 502, A transmits $C_{A,1}x_A(t)$, C transmits $C_{C,1}x_C(t)$, E transmits $C_{E,1}x_E(t)$; while in the second time interval 504, A transmits $C_{A,2}x_A(t)$, C transmits $C_{C,2}x_C(t)$, E transmits $C_{E,2}x_E(t)$. The coefficients $C_{A,1}$ and $C_{A,2}$ are chosen as a function of an identifier (e.g., MAC ID) of the transmitter A and/or the receiver B. In accordance with an embodiment, the choices of $C_{A,1}$ and $C_{A,2}$ are independent of the other concurrent transmitters/receivers (e.g., C, D, E, F, etc.) In other embodiments, coefficients $C_{A,1}$ and $C_{A,2}$ change from one time to another.

A receiver can combine the signals received in the first and second sets of bandwidth in order to eliminate the dominant interference, or to boost the signal-to-interference ratio. Consider receiver B in the above example. The received composite signal in the first time interval is:

$$y_1 = C_{A,1}x_A(t)h_{AB} + C_{C,1}x_C(t)h_{CB} + C_{E,1}x_E(t)h_{EB} + \text{noise} \quad (12)$$

The received composite signal in the second time interval is:

$$y_2 = C_{A,2}x_A(t)h_{AB} + C_{C,2}x_C(t)h_{CB} + C_{E,2}x_E(t)h_{EB} + \text{noise} \quad (13)$$

The combined signal is given by:

$$y = \alpha y_1 + \beta y_2 = \alpha(C_{A,1}x_A(t)h_{AB} + C_{C,1}x_C(t)h_{CB} + C_{E,1}x_E(t)h_{EB}) +$$

$$\beta(C_{A,2}x_A(t)h_{AB} + C_{C,2}x_C(t)h_{CB} + C_{E,2}x_E(t)h_{EB}) + \text{noise} \quad (14)$$

where α and β are the combining coefficients.

The receiver at B determines the combining coefficients depending on the interference situation. For example, assuming that transmitter at C is the dominant interferer for the receiver at B, it is desirable to eliminate the interference from C entirely. Accordingly, the combining coefficients are determined so that $\alpha C_{C,1} + \beta C_{C,2} = 0$. Note that in this example, the determination of the combining coefficients does not depend on the estimation of channel coefficients h. Such a choice is similar to a zero-force scheme to completely cancel the interference. The receiver needs to identify the dominant interferer, and find out the coefficients $C_{C,1}$, $C_{C,2}$ used by the dominant interferer. In another example, the combining coefficients may be determined to maximize the resultant SIR, in which case, the determination of the combining coefficients may depend on the estimation of channel coefficients. The scheme described herein is in essence a reuse-2 scheme, in which twice the bandwidth is used to send a given signal. Advantageously, the receiver can entirely eliminate one dominant interferer.

Each of the first and the second time durations may be of one or a plurality of symbols long. The length of the time duration reflects a tradeoff. On one hand, the scheme depends on the synchronization of the transmitters, with the goal being that the transmitters have the same time notion of the first and the second time durations. Thus, long time duration makes it easier to accommodate small misalignment of the timing of different transmitters. On the other hand, it is desired that the channel remains the same in the first and the second time durations. Thus, a short time duration makes it easier to maintain constant channel.

In an OFDM system, the first and the second sets of bandwidth can be a set of tones in a first time interval and another set of tones in a second time interval. The first and the second sets of tones are usually the same. Alternatively, the first and the second sets of bandwidth can be a set of tones in a time interval and another set of tones in the same time interval. The first and the second sets of tones are preferably close to each other in frequency.

We now describe determining coefficients $C_{A,1}$, $C_{A,2}$ in accordance with other aspects. Under the assumption that transmitter at C is the dominant interferer for the receiver at B, coefficients $C_{A,1}$, $C_{A,2}$ can be modeled as random variables that are independent of random variables $C_{C,1}$, $C_{C,2}$. For a given choice of these coefficients, the optimal processing from a capacity point of view is given by the MMSE (minimum mean square error) filter. Accordingly, the optimal MMSE receiver $C_B$ is given by:

$$C_B = C_A^H (I + P_C |h_{CB}|^2 C_C C_C^H)^{-1} \quad (15)$$

wherein the vector $[C_{C,1}, C_{C,2}]^H$ is denoted by Cc and similar notation is used for other vectors. The capacity for the aforementioned MMSE filter is given by:

$$\text{Capacity of } C_B = \log(\det(I + C_A^H (I + P_C |h_{CB}|^2 C_C C_C^H)^{-1} C_A P_B)) \quad (16)$$

The expected value of the capacity for filter $C_B$ is optimized under the following constraints:
1. The coefficients for different users are picked independently and have an identical distribution.
2. Total power used is constant; e.g., $|C_{A,1}|^2 + |C_{A,2}|^2 = 2$.

Thus, it is desirable to maximize:

$$E_{C_A, C_C}[\log(\det(I + C_A^H (I + P_C |h_{CB}|^2 C_C C_C^H)^{-1} C_A P_B))] \quad (17)$$

with the constraint that $C_A$ and $C_C$ are i.i.d. and norm one vectors. Choosing $C_A$ such that it is uniformly distributed norm one vector in $C^2$, where $C^2$ is the two dimensional complex space (with each dimension being a complex square), can maximize the capacity of the MMSE receiver $C_B$. This is also called the Haar measure. In practice, it can be generated by generating a random unitary matrix and taking the first column. Each communication pair shares the seed for generating this vector. Moreover, in this example, B needs to know the seed that A is using as well as the seed that C is using.

Figure 6:
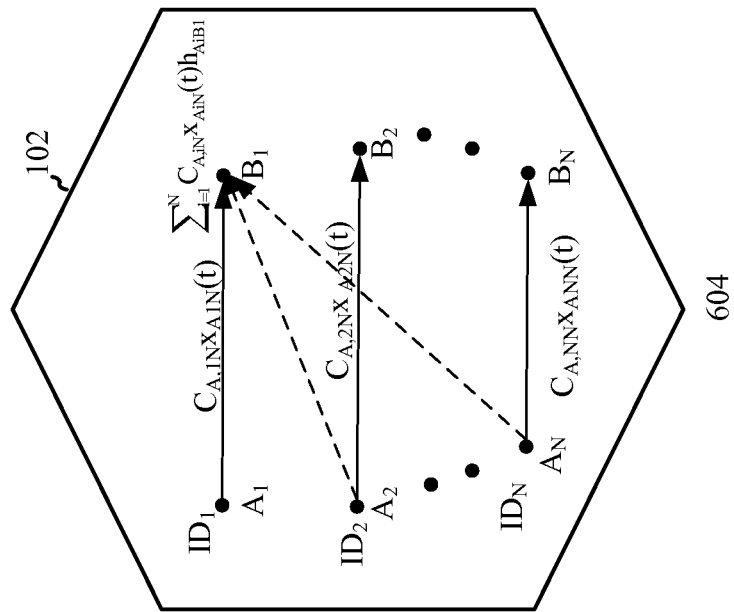
FIG. 6 illustrates another multiple access communication system which mitigates the effects of interference in accordance with yet another aspect.
Figure 6:
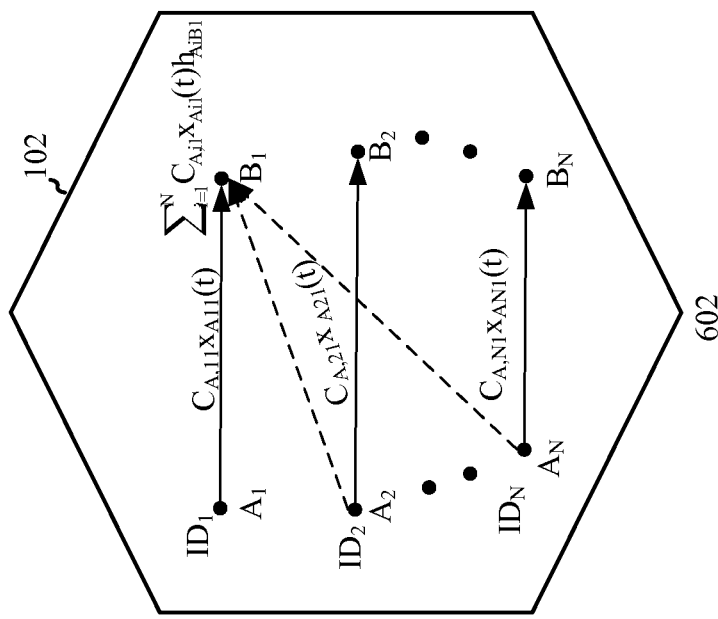

FIG. 6 illustrates another multiple access communication system which mitigates the effects of interference in accordance with yet another aspect. It comprises multiple transmitters $A_1, A_2, \ldots, A_N$ with respective IDs as $ID_1, ID_{12}, ID_N$ well as multiple receivers $B_1, B_2, \ldots, B_N$. Let $x_1(t), x_2(t), \ldots, x_N(t)$ be the original signals to be sent by transmitters $A_1, A_2, \ldots, A_N$ respectively. The original signals can be coded signals. As stated supra, the signals sent during the first time interval and second time interval can be obtained from the original signal in a predetermined manner by multiplying it with complex coefficients. Accordingly, in the first time interval 602, $A_1$ transmits $C_{A,11}x_1(t)$, $A_2$ transmits $C_{A,21}x_2(t)$, ..., $A_N$ transmits $C_{A,N1}x_N(t)$; while in the second time interval (not shown in the figure), $A_1$ transmits $C_{A,12}x_1(t)$, $A_2$ transmits $C_{A,22}x_2(t)$, ... $A_N$ transmits $C_{A,N2}x_N(t)$. Similarly in the Nth time interval 604, $A_1$ transmits $C_{A,1N}x_1(t)$, $A_2$ transmits $C_{A,2N}x_2(t)$, ... $A_N$ transmits $C_{A,NN}x_N(t)$. The coefficients $C_{A,11} \ldots C_{A,NN}$ are chosen as functions of identifiers, $ID_1$, $ID_{12}, \ldots ID_N$ (e.g., MAC ID) of the respective transmitters $A_1, A_2, \ldots, A_N$ and/or the receivers $B_1, B_2, \ldots, B_N$.

A receiver can combine the signals received in the N sets of bandwidth in order to eliminate (N−1) dominant interferers. Consider receiver $B_1$ in the above communication system. The received composite signal in the first time interval is:

$$y_1 = C_{A,11}x_1(t)h_{A1B1} + \ldots + C_{A,N1}x_N(t)h_{ANB1} + \text{noise} \quad (15)$$

Similarly the received composite signal in the $N^{th}$ time interval is:

$$y_N = C_{A,1N}x_1(t)h_{A1B1} + \ldots + C_{A,NN}x_N(t)h_{ANB1} + \text{noise} \quad (16)$$

The combined signal from all the N transmitters in all the N time intervals at $B_1$ is given by:

$$y = \alpha_1 y_1 + \alpha_2 y_2 + \ldots + \alpha_N y_n \quad (17)$$

wherein $\alpha_1, \alpha_2, \ldots, \alpha_N$ are the combining coefficients.

As detailed supra, receiver at $B_1$ determines the combining coefficients depending on the interference situation. Accordingly, it is assumed that the signal from transmitter $A_1$ is the desired signal for the receiver at $B_1$. The interference from the remaining transmitters $A_2, \ldots, A_N$ can be reduced at $B_1$ via selection of appropriate combining coefficients. For each of the transmitters $A_2, \ldots, A_N$ the receiver at $B_1$ needs to sense the coefficients $C_{A2,1}, C_{A2,2} \ldots C_{A2,N}, C_{A3,1}, \ldots C_{A3,N}, \ldots C_{AN,1} \ldots C_{AN,N}$ used by each of dominant interferers for the N time intervals. The combining coefficients can also be determined to maximize the resultant SIR, in which case, the determination of the combining coefficients may depend on the estimation of channel coefficients. The reuse-2 scheme described supra with respect to FIG. 5 is now generalized to a reuse-N scheme (N>2), in which the original signal is repeated in N sets of bandwidth, each repeated signal being scrambled with a unique coefficient. Advantageously, the receiver at $B_1$ can now entirely eliminate N−1 dominant interferers.

Figure 7:
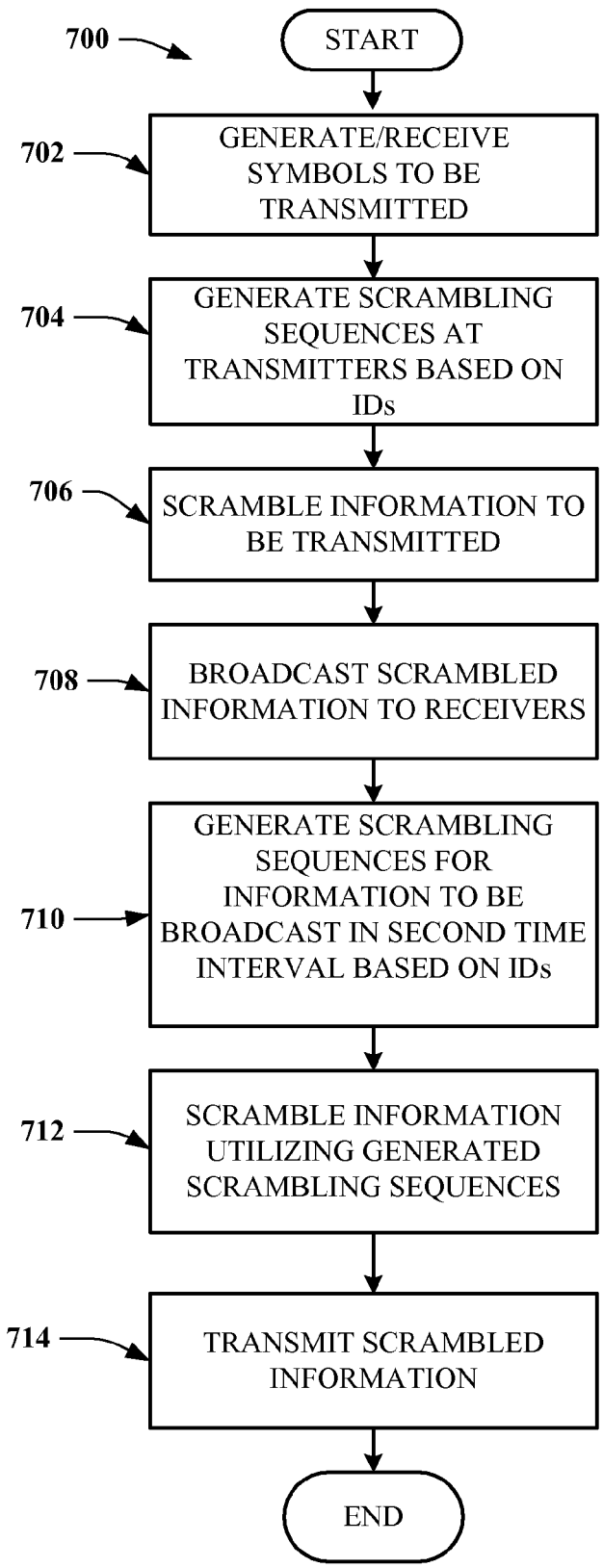
FIG. 7 depicts a methodology of transmitting data symbols that aids in reducing interference in accordance with an aspect.

FIG. 7 depicts a methodology 700 of transmitting data symbols that aids in reducing interference in accordance with an aspect. By way of illustration and not limitation, it is assumed that a data block of 100 symbols are to be transmitted by each of A and C. A transmitter at A transmits symbols $a_1, a_2, a_3, \ldots a_{100}$ to B while a transmitter at C transmits $c_1, c_2, c_3, \ldots c_{100}$ to a receiver at D during a first time period. As described supra, for the receiver at B, the symbols $a_1, a_2, a_3 \ldots a_{100}$ from A is the desired signal whereas C is the dominant interferer. Accordingly, at 702 the symbols $a_1, a_2, a_3, \ldots a_{100}$ to be transmitted to B are initially generated/received and similarly $c_1, c_2, c_3, \ldots c_{100}$ are generated/received at C. At 704, A generates the scrambling sequence $e_1, e_2, e_3, \ldots e_{100}$ while C generates scrambling sequence $g_1, g_2, g_3, \ldots g_{100}$. The scrambling sequences are generated such that there are at least two i, j wherein:

$$|e_i| \neq |e_j| \text{ and } |g_i| \neq |g_j| \quad (18)$$

Generally, the symbols within the scrambling sequences are generated such that they vary in terms of the phase associated with the symbols while maintaining the same amplitude. In contrast, the scrambling sequences $e_1, e_2, e_3, \ldots e_{100}$ and $g_1, g_2, g_3, \ldots g_{100}$ are generated such that there are at least two symbols within each of these sequences with different amplitudes. Furthermore, as discussed supra, the scrambling sequences are generated based on IDs associated with the transmitters at A/C and/or receivers at B/D. For example if $ID_1$ and $ID_2$ are the IDs associated with connections of the transmitters at A and C to their intended receivers at B and D respectively, then the sequences $e_1, e_2, e_3, \ldots e_{100}$ and $g_1, g_2, g_3, \ldots g_{100}$ can be a functions of $ID_1$ and $ID_2$ respectively. The symbols $a_1, a_2, a_3, \ldots a_{100}$ and $c_1, c_2, c_3, \ldots c_{100}$ are then scrambled utilizing the scrambling sequences $e_1, e_2, e_3, \ldots e_{100}$ and $g_1, g_2, g_3, \ldots g_{100}$ respectively at 706. At 708, the scrambled sequences are broadcast by the transmitters at A and C.

Subsequently the information symbols $a_1, a_2, a_3, \ldots a_{100}$ and $c_1, c_2, c_3 \ldots c_{100}$ are again repeated in a second time interval. Accordingly, at 710, scrambling sequences $f_1, f_2, f_3, \ldots f_{100}$ and $h_1, h_2, h_3, \ldots h_{100}$ are generated by transmitters at A and C respectively. These sequences are generated such that for every i:

$$|e_i|^2 + |f_i|^2 = 2 \text{ and } |g_i|^2 + |h_i|^2 = 2 \qquad (19)$$

At 712, the information to be transmitted is scrambled utilizing sequences generated at 710. Finally at 714, scrambled symbols $a_1 f_1, a_2 f_2, \ldots, a_{100} f_{100}$ and similarly $c_1 h_1, \ldots, c_{100} h_{100}$ are broadcast by the transmitters at A and C respectively. In view of the aforementioned constraints on the scrambling sequences, the total power used remains constant. In one embodiment, each of the first and the second time intervals includes a number of symbol time durations. A transmits scrambled symbol $a_1 e_1$ and C transmits scrambled symbol $c_1 g_1$ in the first symbol time duration of the first time interval, A transmits scrambled symbol $a_2 e_2$ and C transmits scrambled symbol $c_2 g_2$ in the second symbol time duration of the first time interval, and so on. A transmits scrambled symbol $a_1 f_1$ and C transmits scrambled symbol $c_1 h_1$ in the first symbol time duration of the second time interval, A transmits scrambled symbol $a_2 f_2$ and C transmits scrambled symbol $c_2 h_2$ in the second symbol time duration of the second time interval, and so on. In another embodiment, each of the first and the second time intervals includes at least one OFDM symbol. A transmits scrambled symbol $a_1 e_1$ and C transmits scrambled symbol $c_1 g_1$ in the first tone of the OFDM symbol in the first time interval, A transmits scrambled symbol $a_2 e_2$ and C transmits scrambled symbol $c_2 g_2$ in the second tone of the OFDM symbol in the first time interval, and so on. A transmits scrambled symbol $a_1 f_1$ and C transmits scrambled symbol $c_1 h_1$ in the first tone of the OFDM symbol in the second time interval, A transmits scrambled symbol $a_2 f_2$ and C transmits scrambled symbol $c_2 h_2$ in the second tone of the OFDM symbol in the second time interval, and so on.

Figure 8:
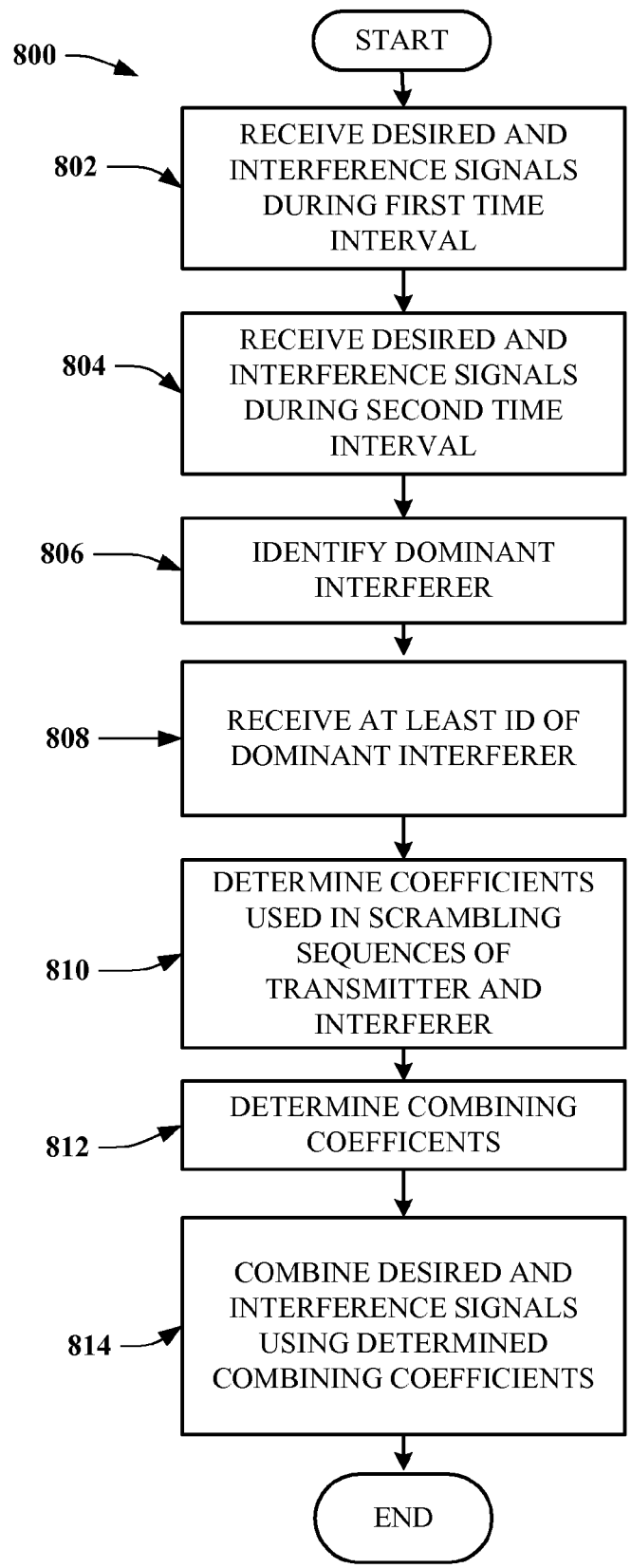
FIG. 8 depicts a methodology of combining signals in accordance with an aspect.

FIG. 8 depicts a methodology 800 of combining signals in accordance with an aspect described with respect to the system disclosed in FIG. 4. Accordingly, the symbols from A are the desired signal whereas C is the dominant interferer for a receiver at B. At 802, it receives scrambled symbols $a_1 e_1, a_2 e_2, \ldots a_{100} e_{100}$ from transmitter at A and an interference signal $c_1 g_1, \ldots, c_{100} g_{100}$ from the transmitter at C during a first time interval. At 804, the receiver at B receives a second scrambled signal $a_1 f_1, a_2 f_2, \ldots a_{100} f_{100}$ from A and $c_1 h_1, \ldots c_{100} h_{100}$ from C during a second time interval. It is to be understood that the receiver at B may receive other transmission during these time intervals. At 806, the receiver at B identifies the transmitter at C as the dominant interferer for the current communication link. At 808, the receiver at B senses at least the identification broadcast by the dominant interferer C. The receiver can also obtain ID broadcast by the transmitter at A in order to determine coefficients of respective scrambling sequences or it may have prior knowledge of the coefficients used by A. At 810, the receiver at B determines coefficients utilized in the scrambling sequences of the transmitter A and the dominant interferer C. At 812, combining coefficients α, β are calculated by the receiver at B such that the inference from the dominant interferer C is minimized or the SIR ratio of the desired signal from A to interference from C is maximized as further detailed infra. At 814, the desired signal and the signal from the dominant interferer are combined using the determined combining coefficients thereby minimizing or even cancelling interference from a dominant interferer.

Figure 9:
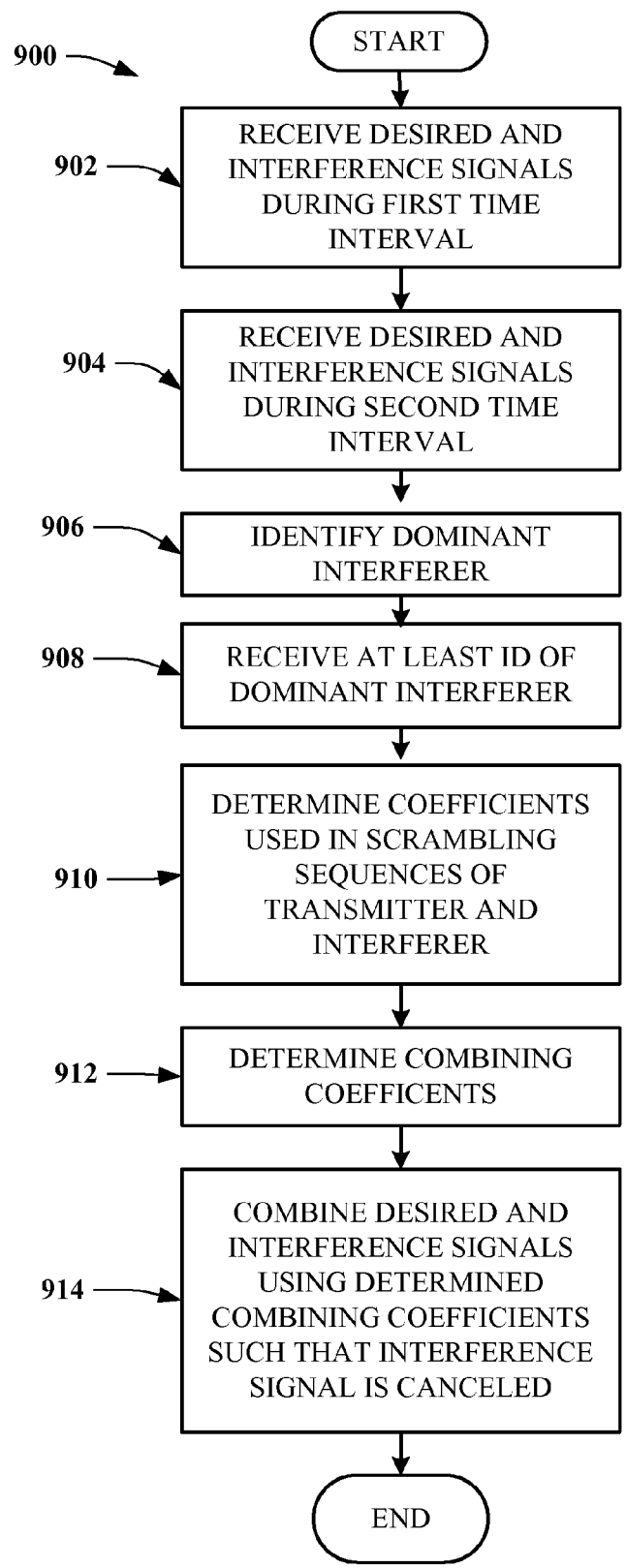
FIG. 9 relates to a methodology of determining the combining coefficients in a manner that cancels interference from the dominant interferer in accordance with an aspect.

FIG. 9 relates to a methodology 900 of determining the combining coefficients in a manner that cancels interference from the dominant interferer in accordance with an aspect. At 902, the desired sequence $a_1 e_1, a_2 e_2, \ldots, a_{100} e_{100}$ and the signal from the dominant interferer $c_1 g_1, \ldots c_{100} g_{100}$ are received at a receiver during a first time interval. At 904, the desired sequence $a_1 f_1, a_2 f_2, \ldots a_{100} f_{100}$ and the signal from the dominant interferer $c_1 h_1, \ldots c_{100} h_{100}$ are received by the receiver during a second time interval wherein the first and second time intervals are non-overlapping. At 906, the receiver identifies a dominant interferer for the current communication link. IDs associated with the transmitter and dominant interferer are received at 908. As stated supra, the receiver may have prior knowledge of coefficients used by the desired transmitter however, it would require the ID from the dominant interferer to determine scrambling coefficients used in interference signal. At 910, coefficients used in the scrambling sequences by the transmitter and the dominant interferer are determined from the sensed IDs. Knowledge of coefficients employed by the dominant interferer and the desired transmitter are used to determine coefficients for combining signals from the dominant interferer and the desired transmitter at 912. Thus, two combining coefficients are estimated based on the coefficients $e_i, f_i$ in a zero-forcing manner so as to cancel the signal from the dominant interferer. At 914, the desired signal and the interference signal are combined using the determined combining coefficients in a manner that cancels the interference signal. As the information symbols are scrambled based on IDs associated with the transmitter and/or receiver, the knowledge of such IDs can be employed in determining the values of scrambling coefficients $e_i, f_i, g_i,$ and $h_i$. Further, this procedure can be extended to determine N number of combining coefficients so that signals from (N−1) dominant interferers can be canceled as detailed supra.

Figure 10:
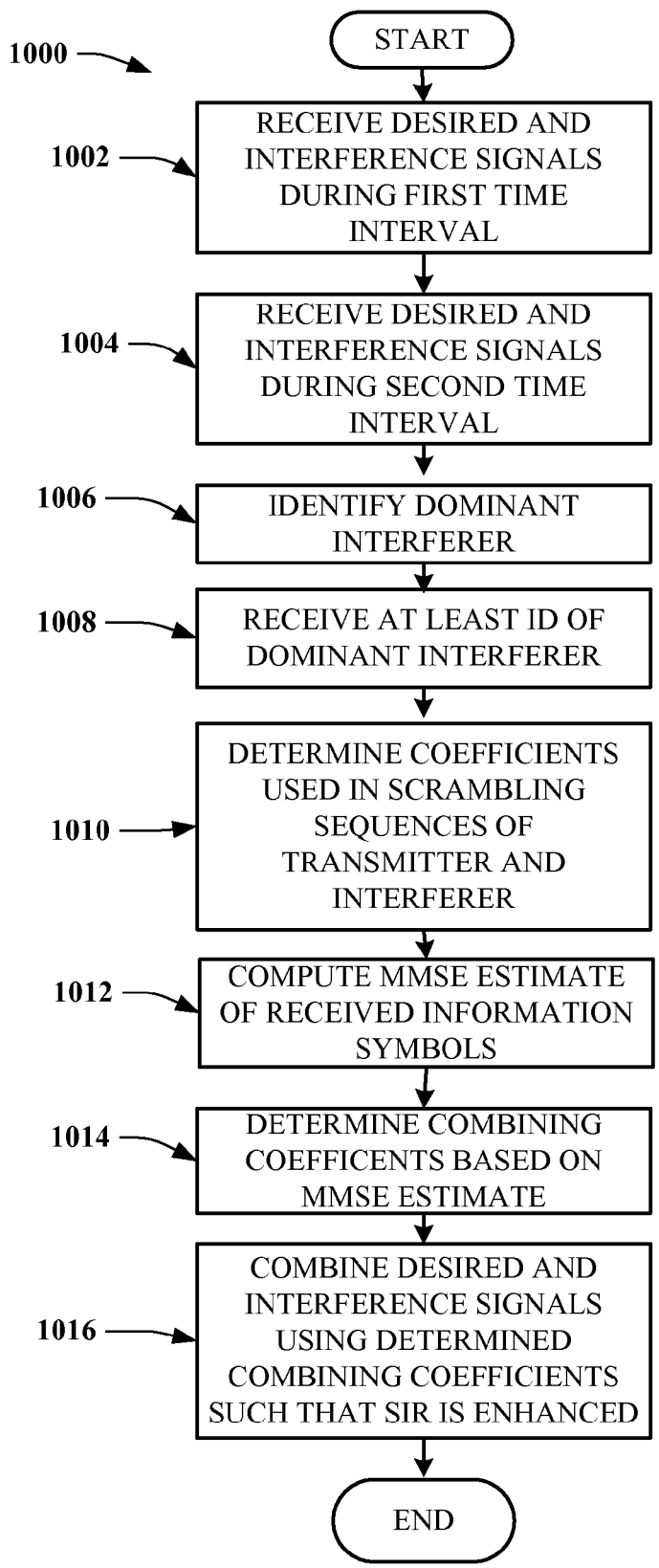
FIG. 10 is a flow chart detailing a methodology of determining combining coefficients in a manner that maximizes the SNR of the received signal in accordance with an aspect.

FIG. 10 is a flow chart 1000 detailing a methodology of determining the combining coefficients in a manner that maximizes the SNR of the received signal in accordance with an aspect. At 1002, the data blocks of desired sequence and signal from one or more interferers are received during a first time interval. For example, in the case discussed with respect to FIG. 9, the receiver obtains data blocks $a_1 e_1, a_2 e_2, \ldots a_{100} e_{100}$ as the desired sequence while $c_1 g_1, \ldots c_{100} g_{100}$ is the interfering signal during a first time interval. At 1004, the desired sequence and the signal from the one or more interferers are received during a second time interval wherein the first and second time intervals are non-overlapping. Similarly, the desired sequence $a_1 f_1, a_2 f_2, \ldots a_{100} f_{100}$ and the signal from an interferer $c_1 h_1, \ldots c_{100} h_{100}$ are received at B during a second time interval. At 1006 it is identified that transmitter sending blocks $c_1 g_1, \ldots, c_{100} g_{100}$ and $c_1 h_1, \ldots c_{100} h_{100}$ is the dominant interferer. At 1008, the receiver senses an ID broadcast by the transmitter and the interferer. At 1010 each data block received during the first and second time intervals is decoded in order to determine the coefficients in the scrambling sequences. Thus, each of the one hundred data blocks received during the first and second time intervals, $a_1e_1, a_2e_2, \ldots a_{100}e_{100}$ and $a_1f_1, a_2f_2, \ldots a_{100}f_{100}$ from the desired transmitter as well as information blocks $c_1g_1, \ldots, c_{100}g_{100}$, and $c_1h_1, \ldots c_{100}h_{100}$ from the dominant interferer are decoded in order to obtain the coefficients $e_1$ to $e_{100}$, $f_1$ to $f_{100}$ as well as $g_1$ to $g_{100}$ and $h_1$ to $h_{100}$. While the receiver at B may obtain the scrambling coefficients $e_1$ to $e_{100}$, $f_1$ to $f_{100}$ from the desired transmitter based on a predetermined decoding algorithm, the coefficients associated with the scrambling sequences $g_1$ to $g_{100}$ and $h_1$ to $h_{100}$ of the dominant interferer be obtained via its broadcasted ID as this ID is associated with the changes in its signal being effected by the dominant interferer. At 1012, an MMSE estimate of the encoded data $a_1$ to $a_{100}$, is derived for each of the information blocks based on the coefficients employed in the desired and the interfering signals received during the first and second time intervals. Subsequently, at 1014, the coefficients for combining the desired and interfering signals for the information block comprising $a_1$ are derived from the MMSE estimate of the demodulated data given the knowledge of coefficients $e_1, f_1, g_1,$ and $h_1$. Therefore, in the case of MMSE scheme, the combining coefficients depend on $g_i, h_i$ and $e_i, f_i$. However, in the former case of zero-forcing scheme, the combining coefficients depend on $g_i, h_i$ but not on $e_i, f_i$. At 1016, the desired signal and the interference signal are combined using the determined combining coefficients in a manner that cancels the interference signal.

Zero-forcing like schemes which cancel the interfering signal can also lead to cancellation of the desired signal if the interferer signal is identical to the desired signal. On the other hand, projecting the combined signal along the vector of the desired signal can lead to increasing the interfering signal. The disadvantages of these methods can be overcome via employing an MMSE estimate of the decoded data which provides an optimal solution to determine combining coefficients. Therefore, the SNR of the decoded data $a_1$ would now depend on choice of coefficients $e_1, f_1,$ and $g_1, h_1$ wherein each pair is selected independently of the other but are preferably orthogonal to each other. This SNR can be maximized by selecting the scrambling coefficients based on conditions given in equation (19). As stated supra, these coefficients would be complex numbers that are uniformly distributed norm one vectors in $C^2$, where $C^2$ is the two dimensional complex space.

Figure 11:
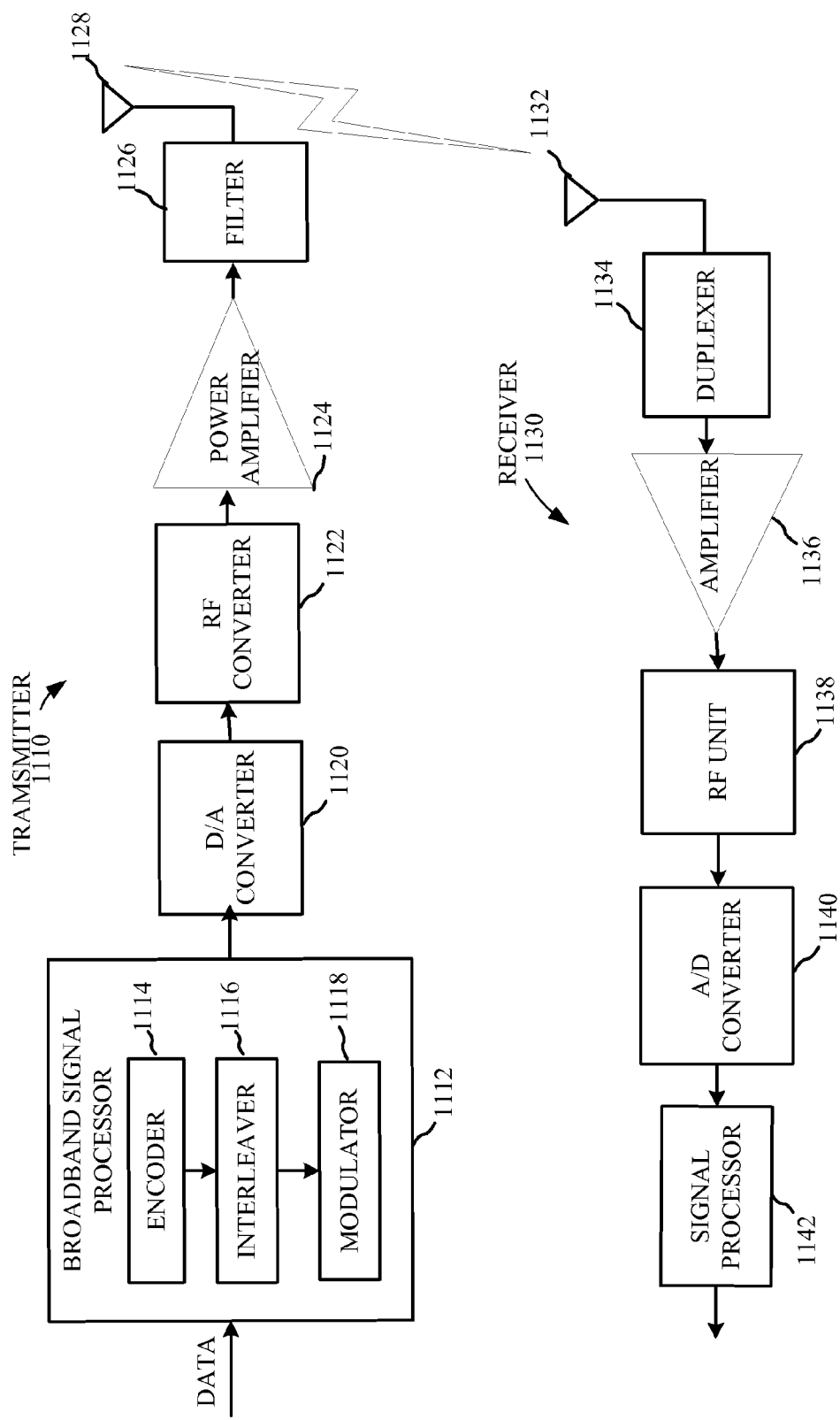
FIG. 11 is a block diagram of a transmitter unit and a receiver unit that can be employed to implement a method of communication that reduces interference in accordance with various aspects.

FIG. 11 is a block diagram of a transmitter unit and a receiver unit that can be employed to implement a method of communication that reduces interference in accordance with various aspects as detailed above. The transmitter unit 1110 comprises a baseband signal processor 1112 that receives bits/information to be transmitted. The information to be transmitted may be associated with various aspects of a communication system. For example, within a cellular communication system the information can pertain to data and/or control bits associated with a user or a base station depending on the particular component that comprises the transmitter. The processor 1112 can further comprises an encoder 1114, interleaver 1116 and a modulator 1118 to encode, interleave and modulate the received information in accordance with aspects as described supra. For example, the information can be modulated using symbols as detailed above for reducing interference at the receiver end of the communication system. Thus, the output from the digital signal processor 1112 comprising digitized modulated signals is fed to a D/A converter 11120 for conversion to analog form. The analog signals are then up-converted to a predetermined frequency by the RF converter 1122 based on the requirements of the communication system. A power amplifier 1124 amplifies the signals for transmission which are then fed to a filter 1126 for filtering and are transmitted via the antenna 1128.

The signals that are transmitted by a transmitter 1110 can be received and decoded by a receiver 1130. The receiver comprises an antenna 1132 to pick up the signals transmitted by a transmitter 1110. In multiple access communication systems are described supra, there can be multiple transmitters which are transmitting simultaneously to various receivers. In accordance with various aspects, the second transmitter may be identified as the dominant interferer and various methodologies as detailed above can be implemented to mitigate the effect of a signal from the dominant interferer. Thus, the antenna 1132 of the receiver 1130 can not only receive a desired signal from the transmitter 1110 but can also receive an interfering signal from a second transmitter which can comprise a structure similar to 1110. The received signals are passed through a duplexer 1134 which can separate received signals from signals to be transmitted if a transmitter is combined with the receiver 1130. The received signals are then amplified by an amplifier 1136 which are then down-converted to an appropriate frequency by an RF down-conversion unit 1138. The analog output from the RF unit is then passed through an A/D converter 1140. The digitized output from the A/D converter is then input to a signal processor 1142. The signal process 1142 separates and decodes received information in accordance with various aspects described above. For example, if the receiver 1130 receives signals from a transmitter as well as a dominant interferer, the signal processor can generate combining coefficients to combine a desired signal and an interfering signal in a manner that cancels the interference or enhances SNR of the received symbols via other methodologies such as MMSE depending on various aspects as detailed supra. In accordance with different aspects, the combining coefficients can be determined based on coefficients of the scrambling sequences of the received signals as detected by the processor 1142. While this system has been described with respect to a transmitter/receiver comprising a single antenna for transmitting and/or receiving symbols for brevity, it should be noted that methods of reducing interference as detailed herein can also be implemented in various other communication systems, such as MIMO (multiple input multiple output) communication systems that include multiple transmit and/or receive antennas.

Figure 12:
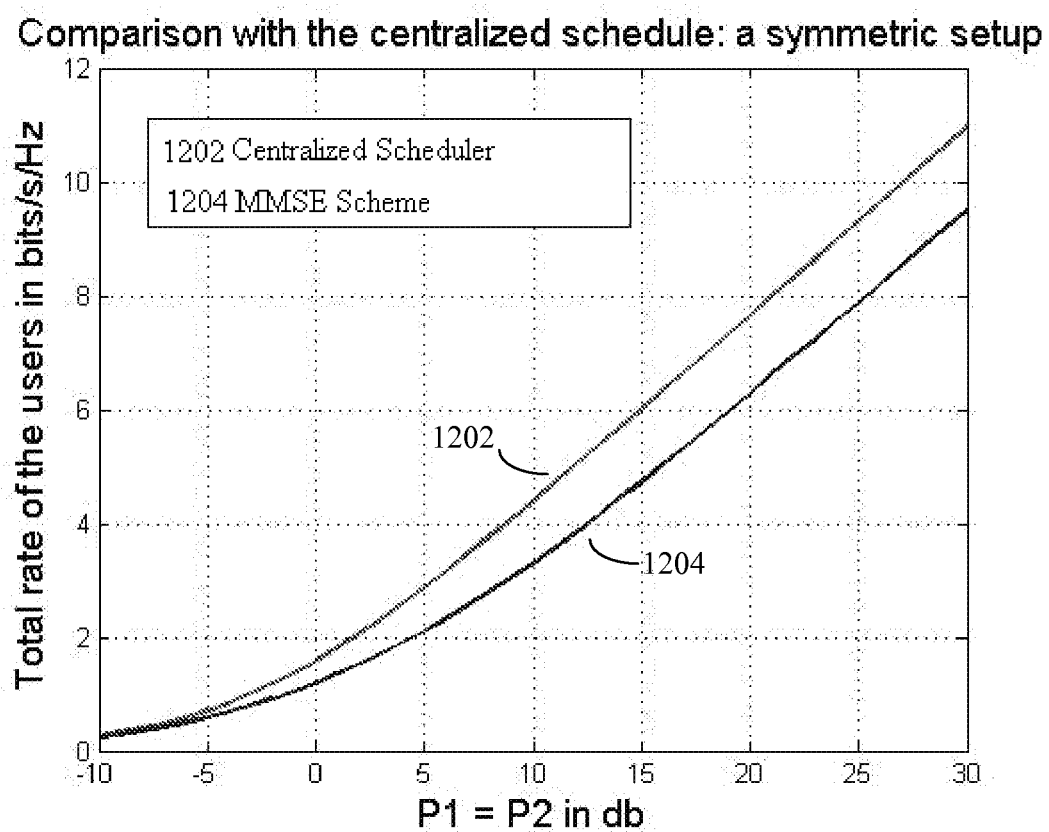
FIG. 12 is a graph illustrating capacity curves comparing an aspect with an ideal case.

FIG. 12 is a graph that shows the capacity curves for the MMSE scheme described in FIG. 10 (for curve 1204) as compared to the ideal case (1202) when there is central authority that divided the bandwidth chunks between transmitters of A and C equally. The scheme in FIG. 10 is around 3-4 db off from the centralized scheme.

One or more aspects of a wireless communication system design are described that support full & half duplex FDD (Frequency Division Duplex) and TDD (Time Division Duplex) modes of operation, with support for scalable bandwidth. However, this need not be the case, and other modes may also be supported, in addition to, or in lieu of, the previous modes. Further, it should be noted that the concepts and approaches herein, need not be used in conjunction with any other of the concepts or approaches described herein.

The data transmission techniques described herein may be implemented by various means. For example, these techniques may be implemented in hardware, firmware, software, or a combination thereof. For a hardware implementation, the processing units used for data transmission at a transmitter or data reception at a receiver may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the techniques may be implemented with modules (e.g., procedures, functions, and so on) that perform the functions described herein. The firmware and/or software codes may be stored in a memory and executed by a processor. The memory may be implemented within the processor or external to the processor.

The previous description of the disclosed embodiments is provided to enable any person skilled in the art to make or use the disclosure. Various modifications to these embodiments will be readily apparent to those skilled in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

What has been described above includes examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A method of operating a receiver for communicating with a first transmitter, comprising:
    receiving a first composite signal during a first time period;
    receiving a second composite signal, said first and second composite signals being received on different resources, said different resources corresponding to i) different non-overlapping time periods or ii) different non-overlapping tones, each of said first and second composite signals including signals transmitted from the first transmitter and from at least a second transmitter, said second transmitter being an interfering transmitter;
    identifying said second transmitter as a dominant interferer;
    determining a first combining coefficient and a second combining coefficient as functions of at least one of the first or second transmitters
    combining the first and the second composite signals using the first and the second combining coefficients to generate a combined signal and
    decoding information transmitted from the first transmitter using the combined signal.

2. The method of claim 1, wherein the combined signal is generated by initially multiplying the first composite signal received during said first time period with the first combining coefficient and the second composite signal received during a second time period with the second combining coefficient and then adding the two resultant signals.

3. The method of claim 2, further comprising determining a first identifier (ID) associated with the signal transmitted from the first transmitter and a second identifier (ID) associated with the signal transmitted from the second transmitter respectively wherein the first and the second combining coefficients are functions of the determined IDs wherein said first and second IDs are identifiers of the first and the second transmitters, respectively.

4. The method of claim 3, further comprising
    receiving a first broadcast signal from the first transmitter;
    determining the first ID from the received first broadcast signal;
    receiving a second broadcast signal from the second transmitter; and
    determining the second ID from the received second broadcast signal.

5. The method of claim 3, further comprising:
    determining a first pair of scrambling coefficients from the first ID;
    determining a second pair of scrambling coefficients from the second ID; and
    determining the first and second combining coefficients from the first and second pairs of scrambling coefficients.

6. The method of claim 5, wherein the first composite signal includes a first desired signal from the first transmitter and the second composite signal includes a second desired signal from the first transmitter, said first desired signal being generated by scrambling a first original signal with a first scrambling coefficient of the first pair of scrambling coefficients and the second desired signal being generated by scrambling the first original signal with a second scrambling coefficient of the first pair of scrambling coefficients at the first transmitter prior to transmission, and
    wherein the first composite signal includes a first dominant interfering signal from the second transmitter and the second composite signal includes a second dominant interfering signal from the second transmitter, said first dominant interfering signal being generated by scrambling a second original signal with a first coefficient of the second pair of the scrambling coefficients at the second transmitter, said second dominant interfering signal being generated by scrambling the second original signal with a second scrambling coefficient of the second pair of the scrambling coefficients at the second transmitter.

7. The method of claim 6, wherein the combining coefficients are determined such that a signal to interference ratio (SIR) of a third desired signal is increased in the combined signal as compared with either a SIR of the first desired signal in the first composite signal or a SIR of the second desired signal in the second composite signal.

8. The method of claim 6, wherein the combining coefficients are determined so that the first and second dominant interfering signals are canceled with each other in the combined signal.

9. The method of claim 5, wherein said first pair of scrambling coefficients includes:
a first scrambling coefficient used by said first transmitter to scramble an original signal to produce a first scrambled signal included in said first composite signal and
a second scrambling coefficient used by said first transmitter to scramble the original signal to produce a second scrambled signal included in said second composite signal.

10. The method of claim 3, further comprising
receiving a third composite signal, said third composite signal including signals transmitted from the first transmitter and signals from at least a third transmitter, said third transmitter being an interfering transmitter;
identifying said third transmitter as another dominant interferer;
determining a third identifier associated with the signal transmitted from the third transmitter;
determining a first combining coefficient, a second combining coefficient, and a third combining coefficient as a function of the determined first, second and third identifiers;
combining the first, the second and the third composite signals using the first, the second and the third combining coefficients respectively to generate a combined signal; and
decoding the information transmitted from the first transmitter using the combined signal.

11. The method of claim 2, further comprising determining a first identifier (ID) associated with the signal transmitted from the first transmitter and a second identifier (ID) associated with the signal transmitted from the second transmitter, wherein said first ID identifies a first connection from the first transmitter to the receiver and the second ID identifies a second connection from the second transmitter to an intended receiver of the second transmitter.

12. The method of claim 1, wherein said first and second composite signals are OFDM signals and received in a first and a second sets of OFDM bandwidth, each of the first and second sets of OFDM bandwidth including a set of tones in a predetermined set of OFDM symbols, said first and second sets of OFDM bandwidths being non-overlapping.

13. A system that reduces interference within a receiver comprising:
a memory that stores a first composite signal received during a first time period and a second composite signal, said first and second composite signals being received on different resources, said different resources corresponding to i) different non-overlapping time periods or ii) different non-overlapping tones, each of said first and second composite signals including signals transmitted from a first transmitter and from at least a second transmitter, said second transmitter being an interfering transmitter, the first composite signal including a first desired signal from the first transmitter and a first interfering signal from the second transmitter, the second composite signal including a second desired signal from the first transmitter and a second interfering signal from the second transmitter; and
a processor that: identifies the second transmitter as a dominant interferer, determines a first combining coefficient as a function of an identifier corresponding to the first transmitter and a second combining coefficient as a function of an identifier corresponding to the second transmitter, combines the first and the second composite signals using the first and the second combining coefficients to generate a combined signal. and decodes information included in the combined signal that was communicated from the first transmitter.

14. The system of claim 13, wherein the combined signal is generated by summing a product of the first composite signal received during said first time period with the first combining coefficient and a product of the second composite signal received during a second time period with the second combining coefficient.

15. The system of claim 13, further comprising a component that determines a first identifier (ID) associated with the signal transmitted from the first transmitter and a second identifier (ID) associated with the signal transmitted from the second transmitter respectively wherein the first ID is associated with connection from the first transmitter to the receiver and the second ID is associated with connection from the second transmitter to an intended receiver of the second transmitter, 16. The system of claim 15, wherein the processor determines the first ID and the second ID utilizing signals broadcast by the first and second transmitters respectively.

17. The system of claim 13, wherein the first desired signal is generated at the first transmitter by scrambling a first original signal using a first scrambling coefficient of a first pair of scrambling coefficients, the second desired signal is generated at the first transmitter by scrambling the first original signal using a second coefficient for the first pair of scrambling coefficients while the first interfering signal is generated at the second transmitter by scrambling a second original signal with a first coefficient of a second pair of scrambling coefficients and the second interfering signal is generated at the second transmitter by scrambling the second original signal with a second coefficient of the second pair of scrambling coefficients.

18. The system of claim 17, wherein the first and second pair of scrambling coefficients are determined at the receiver based on the first and the second IDs respectively.

19. The system of claim 13, wherein the first and second composite signals are respectively received in a first and a second non-overlapping time intervals.

20. The system of claim 13, wherein the first and second composite signals are OFDM signals and received in a first and a second sets of non-overlapping OFDM bandwidth, each of the first and second sets of OFDM bandwidth including a set of tones in a predetermined set of OFDM symbols.

21. The system of claim 13, wherein the processor generates combining coefficients such that a SIR (signal to interference ratio) of a third desired signal is increased in the combined signal as compared to either a SIR of the first desired signal in the first composite signal or a SIR of the second desired signal in the second composite signal.

22. The system of claim 13, wherein the processor generates combining coefficients in a manner that the interfering signals from the first and the second composite signals cancel each other in the combined signal.

23. The system of claim 13, wherein the processor generates N combining coefficients that simultaneously cancel interference from (N−1) interferers at least one of which is the dominant interferer, and wherein N is any integer.

24. A non-transitory computer readable medium with instructions stored thereon for reducing interference within communication systems, comprising:
- receiving a first composite signal during a first time period and a second composite signal, said first and second composite signals being received on different resources, said different resources corresponding to i) different non-overlapping time periods or ii) different non-overlapping tones, each of said first and second composite signals comprising desired signals transmitted from a first transmitter and interfering signals from at least a second transmitter;
- identifying the second transmitter as a dominant interferer;
- determining a first and a second combining coefficients as functions of at least one of the first or the second transmitter;
- combining the first and the second composite signals using the first and the second combining coefficients to generate a combined signal; and
- decoding the information transmitted from the first transmitter using the combined signal.

25. The non-transitory computer readable medium of claim 24, further comprising instructions to generate the combined signal by initially multiplying the first composite signal received during said first time period with the first combining coefficient and the second composite signal received during a second time period with the second combining coefficient and then adding the two resultant signals.

26. The non-transitory computer readable medium of claim 25, further comprising determining a first identifier (ID) associated with the signal transmitted from the first transmitter and a second identifier (ID associated with the signal transmitted from the second transmitter respectively, wherein the first and second combining coefficients are functions of the determined IDs wherein said first and second IDs are identifiers of the first and the second transmitters, respectively.

27. The non-transitory compute readable medium of claim 26, further comprising instructions for:
- determining the first ID from a first broadcast signal received from the first transmitter; and
- determining the second ID from a second broadcast signal received from the second transmitter.

28. The non-transitory compute readable medium of claim 26, further comprising instructions for:
- determining a first pair of scrambling coefficients from the first ID;
- determining a second pair of scrambling coefficients from the second ID; and
- determining the first and second combining coefficients from the first and second pair of scrambling coefficients.

29. The Bon-transitory computer readable medium of claim 26, further comprising instructions for
- identifying a third transmitter as another dominant interferer upon receiving a third composite signal that comprises signals transmitted from the first transmitter and signals from at least a third transmitter;
- determining a third identifier (ID) associated with the signal transmitted from the third transmitter;
- determining a first combining coefficient, a second combining coefficient and a third combining coefficient as a function of the determined first, second and third identifiers;
- combining the first, the second and the third composite signals using the first, the second and the third combining coefficients respectively to generate a combined signal; and
- decoding the information transmitted from the first transmitter using the combined signal.

30. The non-transitory computer readable medium of claim 25 further comprising instructions to determine the combining coefficients such that a signal to interference ratio (SIR) of a third desired signal is increased in the combined signal as compared with either an SIR of the first desired signal in the first composite signal or an SIR of the second desired signal in the second composite signal.

31. The non-transitory computer readable medium of claim 30 comprising instructions to increase the SIR of the third desired signal in the combined signal by determining the combining coefficients such that a first dominant interfering signal and a second dominant interfering signal are canceled with each other in the combined signal.

32. An apparatus for reducing interference comprising:
- means for storing a first composite signal received during a first time period and a second composite signal, said first and second composite signals being received on different resources, said different resources corresponding to i) different non-overlapping time periods or ii) different non-overlapping tones, each of said first and second composite signals including signals transmitted from a first transmitter and from at least a second transmitter, said second transmitter being an interfering transmitter, the first composite signal including a first desired signal from the first transmitter and a first interfering signal from the second transmitter, the second composite signal including a second desired signal from the first transmitter and a second interfering signal from the second transmitter; and
- means for identifying that identifies the second transmitter as a dominant interferer, the means for identifying also determines a first combining coefficient as a function of an identifier corresponding to the first transmitter and a second combining coefficient as a function of an identifier corresponding to the second transmitter, combines the first and the second composite signals using the first and the second combining coefficients to generate a combined signal and decodes information included in the combined signal that was communicated from the first transmitter.

33. The apparatus of claim 32, wherein the means for identifying generates the combined signal by summing a product of the first composite signal received during said first time period with the first combining coefficient and a product of the second composite signal received during a second time period with the second combining coefficient.

34. The apparatus of claim 33, further comprising means for determining a first identifier (ID) associated with the signal transmitted from the first transmitter and a second identifier (ID) associated with the signal transmitted from the second transmitter respectively wherein the first ID is associated with connection from the first transmitter to the receiver and the second ID is associated with connection from the second transmitter to an intended receiver of the second transmitter.

35. The apparatus of claim 34, wherein the means for identifying determines the first and second IDs utilizing signals broadcast by the first and second transmitters respectively.

36. The apparatus of claim 34, wherein the first desired signal is generated at the first transmitter by scrambling a first original signal using a first scrambling coefficient of a first pair of scrambling coefficients, the second desired signal is generated at the first transmitter by scrambling the first original signal using a second scrambling coefficient of the first pair of scrambling coefficients while the first interfering signal is generated at the second transmitter by scrambling a second original signal with a first coefficient of a second pair of scrambling coefficients and the second interfering signal is generated at the second. transmitter by scrambling the second original signal with a second scrambling coefficient of the second pair of scrambling coefficients.

37. The apparatus of claim 36, wherein the first and second pair of scrambling coefficients are determined based on the first and the second IDs respectively.

38. The apparatus of claim 32, wherein the first and second composite signals are respectively received in a first and a second non-overlapping time intervals.

39. The apparatus of claim 32, wherein the first and second composite signals are OFDM signals and received in a first and a second sets of non-overlapping OFDM bandwidth, each of the first and second sets of OFDM bandwidth including a set of tones in a predetermined set of OFDM symbols.

40. The apparatus of claim 32, wherein the combining coefficients are generated such that a SIR (signal to interference ratio) of a third desired signal is increased in the combined signal as compared to either a SIR of the first desired signal in the first composite signal or an SIR of the second desired signal in the second composite signal.

41. The apparatus of claim 40, the combining coefficients are generated in a manner that interfering signals from the first and the second composite signals cancel each other in the combined signal.

42. A method of operating a transmitter for communicating with a first receiver in a traffic channel to reduce interference, comprising:
  partitioning the traffic channel into at least two different sets of communications resources, said at least two different sets of communications resources including a first set of communications resources and a second set of communications resources, said first set of communications resources including: i) at least sonic symbol time duration time periods which are different from symbol time duration time periods included in said second set of communications resources or ii) at least some tones which are not included in said second set of communications resources, each of said first and second sets of communications resources including a plurality of symbol time duration time periods;
  generating a first scrambling coefficient sequence and a second scrambling coefficient sequence as a function of an identifier associated with said transmitter, each of the first and second scrambling coefficient sequences including a plurality of scrambling coefficients;
  scrambling an original signal with scrambling coefficients included in said first scrambling coefficient sequence to generate a first scrambled signal including multiple OFDM symbols;
  transmitting the first scrambled signal in said first set of communications resources;
  scrambling the original signal with scrambling coefficients included in said second scrambling coefficient sequence to generate a second scrambled signal including multiple OFDM symbols; and
  transmitting the second scrambled signal in the second set of communications resources.

43. The method of claim 42, wherein the first set of communications resources includes a first time interval and the second set of communications resources includes a second time interval, said first and second time intervals being non-overlapping with each other.

44. The method of claim 42, said first and second scrambled signals are OFDM signals, each OFDM symbol in said first scrambled signal corresponding to one coefficient of said first scrambling coefficient sequence.

45. The method of claim 42, further comprising:
  broadcasting a signal that represents the identifier.

46. The method of claim 42,
  wherein transmitting the first scrambled signal includes transmitting the first scrambled signal using a wireless transmitter; and
  wherein scrambling the original signal with scrambling coefficients in the second scrambling coefficient sequence introduces a different signal phase change to the original signal than is introduced by scrambling the original signal with the scrambling coefficients in first scrambling coefficient sequence.

47. A method of operating a transmitter for communicating with a first receiver in a traffic channel to reduce interference, comprising:
  partitioning the traffic channel into at least two sets of bandwidth resource, said at least two sets of bandwidth resource being non-overlapping with each other;
  generating a first and a second scrambling coefficients as functions of an identification, said identification identifying a connection between the transmitter and the first receiver;
  scrambling an original signal with the first scrambling coefficient to generate a first scrambled signal;
  transmitting the first scrambled signal in a first one of said at least two sets of bandwidth resource;
  scrambling the original signal with the second scrambling coefficient to generate a second scrambled signal;
  transmitting the second scrambled signal in a second one of said at least two sets of bandwidth resource;
  wherein said original and said first and second scrambled signals are OFDM signals, said each of at least two sets of bandwidth resource includes a set of OFDM tones in a predetermined set of OFDM symbols;
  wherein the first scrambling coefficient represents a first plurality of scrambling coefficients and the second scrambling coefficient represents a second plurality of scrambling coefficients, the method further comprising:
  scrambling the original signal at every OFDM tone in every OFDM symbol of the first set of bandwidth resource with a corresponding scrambling coefficient of the first plurality of scrambling coefficients to generate the first scrambled OFDM signal; and
  scrambling the original signal at every OFDM tone in every OFDM symbol of the second set of bandwidth resource with a corresponding scrambling coefficient of the second plurality of scrambling coefficients to generate the second scrambled OFDM 48. The method of claim 47, wherein the sizes of the first and the second pluralities of scrambling coefficients are the same, and the sizes of the first and the second sets of bandwidth resource are equal.

49. The method of claim 48, wherein a first coefficient in the first plurality of scrambling coefficients that are used to scramble the original signal at an OFDM tone in an OFDM symbol of the first set of bandwidth resource and a second coefficient in the second plurality of scrambling coefficients that are used to scramble the same original signal at a corresponding OFDM tone in a corresponding OFDM symbol of the second set of bandwidth resource are such that the sum of squares of the amplitudes of the first and second coefficients are constant for all the OFDM tones and symbols in the first and second set of bandwidth resource.

50. The method of claim 49, wherein the first and second coefficients have the same amplitude.

51. A system for reducing interference in a traffic channel facilitating communication between a transmitter and a first receiver, comprising:
- a processor that generates a first scrambling coefficient sequence and a second scrambling coefficient sequence as functions of an identifier associated with the transmitter, each of the first and second scrambling coefficient sequences including a plurality of scrambling coefficients, and utilizes the first and second scrambling coefficient sequences to generate a first scrambled signal and a second scrambled signal from an original signal by scrambling the original signal with the first scrambling coefficient sequence and scrambling the original signal with the second scrambling coefficient sequence respectively, each of said first and second scrambled signals including multiple OFDM symbols; and
- one or more transmitting components that transmit the first and second scrambled signals respectively in a first set of communications resources and :second set of communications resources, wherein the first and second sets of communications resources are generated by partitioning the traffic channel into two or more sets of communications resources including said first set of communications resources and said second set of communications resources, said first set of communications resources including: i) at least some symbol time duration time periods which are different from symbol time duration time periods included in said second set of communications resources or ii) at least some tones which are not included in said second set of communications resources, each of said first and second sets of communications resources including a plurality of symbol time duration time periods.

52. The system of claim 51 wherein the first set of communications resources includes a first time interval and the second set of communications resources includes a second time interval, the first and second time intervals being non-overlapping with each other.

53. The system of claim 51, wherein the first and the second scrambled signals are OFDM signals, each OFDM symbol in said first scrambled signal corresponding to one coefficient of said first scrambling coefficient sequence.

54. The system of claim 53, wherein the first scrambling coefficient sequence includes a first plurality of scrambling coefficients and the second scrambling coefficient sequence includes a second plurality of scrambling coefficients.

55. The system of claim 51, the transmitting components broadcast a signal that represents the identifier.

56. A system for reducing interference in a traffic channel facilitating communication between a transmitter and a first receiver, comprising:
- a processor that generates a first and a second scrambling coefficients as functions of an identification which identifies connection between the transmitter and the first receiver and utilizes the scrambling coefficients to generate respective first and a second scrambled signals from an original signal by scrambling the original signal with the first and second scrambling coefficients;
- one or more transmitting components that transmit the first and second scrambled signals respectively in a first one and a second one of two sets of bandwidth resources wherein the first and second one of the two sets of bandwidth resources are generated by partitioning the traffic channel into the two or more sets of bandwidth;
- wherein the first scrambling coefficient represents a first plurality of scrambling coefficients and the second scrambling coefficient represents a second plurality of scrambling coefficients; and
- wherein the original signal is scrambled at every OFDM tone in every OFDM symbol of the first set of bandwidth resource with a corresponding scrambling coefficient of the first plurality of scrambling coefficients to generate the first scrambled OFDM signal and the original signal is scrambled at every OFDM tone in every OFDM symbol of the second set of bandwidth resource with a corresponding scrambling coefficient of the second plurality of scrambling coefficients to generate the second scrambled OFDM signal.

57. The system of claim 56, wherein a first coefficient in the first plurality of scrambling coefficients that are used to scramble the original signal at an OFDM tone in an OFDM symbol of the first set of bandwidth resource and a second coefficient in the second plurality of scrambling coefficients that are used to scramble the same original signal at a corresponding OFDM tone in a corresponding OFDM symbol of the second set of bandwidth resource are such that a sum of squares of amplitudes of the first and second coefficients are constant for all the OFDM tones and symbols in the first and second sets of bandwidth resource.

58. The system of claim 57, the first and second coefficients have the same amplitude.

59. A non-transitory computer readable medium comprising instructions for controlling a transmitter to communicate with a first receiver in a traffic channel to reduce interference, the non-transitory computer readable medium comprising instruction for:
- partitioning the traffic channel info at least two different sets of non-overlapping communications resources, said at least two different sets of communications resources including a first set of communications resources and a second set of communications resources, said first set of communications resources including: i) at least some symbol time duration time periods which are different from symbol time duration time periods included in said second set of communications resources or ii) at least some tones which are not included in said second set of communications resources, each of said first and second sets of communications resources including a plurality of symbol time duration time periods;
- generating a first scrambling coefficient sequence and a second scrambling coefficient sequence as a function of an identifier associated with said transmitter, each of the first and second scrambling coefficient sequences including a plurality of scrambling coefficients;
- scrambling an original signal with scrambling coefficients included in the first scrambling coefficient sequence to generate a first scrambled signal including multiple OFDM symbols;
- transmitting the first scrambled signal in the first set of communications resources;
- scrambling the original signal with scrambling coefficients included in the second scrambling coefficient sequence to generate a second scrambled signal including multiple OFDM symbols; and
- transmitting the second scrambled signal in said second set of communications resources.

60. The non-transitory computer readable medium of claim 59, wherein the first set of communications resources includes a first time interval and the second set of communications resources includes a second time interval, the first and second time intervals being non-overlapping with each other.

61. A non-transitory computer readable medium comprising instructions for controlling a transmitter to communicate with a first receiver in a traffic channel to reduce interference, the non-transitory computer readable medium comprising instruction for:
partitioning the traffic channel into at least two sets of non-overlapping bandwidth resource;
generating a first and a second scrambling coefficients as functions of an identification that identifies a connection between the transmitter and the first receiver;
scrambling an original signal with the first scrambling coefficient to generate a first scrambled signal;
transmitting the first scrambled signal in a first one of said at least two sets of bandwidth resource;
scrambling the original signal with the second scrambling coefficient to generate a second scrambled signal;
transmitting the second scrambled signal in a second one of said at least two sets of bandwidth resource;
scrambling the original signal at every OFDM tone in every OFDM symbol comprised in the first set of bandwidth resource with a corresponding scrambling coefficient of a first plurality of scrambling coefficients to generate a first scrambled OFDM signal, the first plurality of scrambling coefficients are represented by the first scrambling coefficient; and
scrambling the original signal at every OFDM tone in every OFDM symbol comprised in the second set of bandwidth resource with a corresponding scrambling coefficient of the second plurality of scrambling coefficients to generate a second scrambled OFDM signal, the second plurality of scrambling coefficients are represented by the second scrambling coefficient.

62. The non-transitory computer readable medium of claim 61, wherein a first coefficient in the first plurality of scrambling coefficients that are used to scramble the original signal at an OFDM tone in an OFDM symbol of the first set of bandwidth resource and a second coefficient in the second plurality of scrambling coefficients that are used to scramble the same original signal at the corresponding OFDM tone in the corresponding OFDM symbol of the second set of bandwidth resource are such that the sum of squares of the amplitudes of the first and second coefficients are constant for all the OFDM tones and symbols in the first and second set of bandwidth resource.

63. The non-transitory computer readable medium of claim 62, further comprising instructions for generating the first and second coefficients such that they have same amplitude.

64. The non-transitory computer readable medium of claim 61, further comprising instructions for broadcasting a signal that represents the identification.

65. An apparatus for reducing interference in a traffic channel facilitating communication between a transmitter and a first receiver, comprising:
means for generating a first scrambling coefficient sequence and a second scrambling coefficient sequence as a function of an identifier c associated with said transmitter, each of the first and second scrambling coefficient sequences including a plurality of scrambling coefficients, the means for generating utilizing the scrambling coefficients included in said first scrambling coefficient sequence to generate a first scrambled signal including multiple OFDM symbols, and the scrambling coefficients included in said second scrambling coefficient sequence to generate a second scrambled signal including multiple OFDM symbols, from an original signal by scrambling the original signal with the scrambling coefficients included in said first and second scrambling coefficient sequences, respectively; and
means for communicating the first and second scrambled signals respectively in a first set of communications resources and a second set of communications resources wherein the first and second sets of communications resources are generated by partitioning the traffic channel into two or more different sets of communications resources including said first set of communications resources and said second set of communications resources, said first set of communications resources including: i) at least some symbol time duration time periods which are different from symbol time duration time periods included in said second set of communications resources or ii) at least some tones which are not included in said second set of communications resources, each of said first and second sets of communications resources including a plurality of symbol time duration time periods.

66. The apparatus of claim 65, wherein the first and second sets of communications resources respectively comprise a first time interval and a second time interval, the first and second time intervals are non-overlapping with each other.

67. The apparatus of claim 65, wherein the first and the second scrambled signals are OFDM signals, each OFDM symbol in said first scrambled signal corresponding to one coefficient of said first scrambling coefficient sequence.

68. The apparatus of claim 67, wherein the first scrambling coefficient sequence includes a first plurality of scrambling coefficients and the second scrambling coefficient sequence includes a second plurality of scrambling coefficients.

69. The apparatus of claim 65, the means for communicating broadcasts a signal that represents the identifier.

70. An apparatus for reducing interference in a traffic channel facilitating communication between a transmitter and a first receiver, comprising:
means for generating a first and a second scrambling coefficients as functions of an identification which identifies connection between the transmitter and the first receiver, the generating means utilizes the scrambling coefficients to also generate respective first and a second scrambled signals from an original signal by scrambling the original signal with the first and second scrambling coefficients;
means for communicating the first and second scrambled signals respectively in a first one and a second one of two sets of bandwidth resources wherein the first and second one of the two sets of bandwidth resources are generated by partitioning the traffic channel into the two or more sets of bandwidth;
wherein the first scrambling coefficient represents a first plurality of scrambling coefficients and the second scrambling coefficient represents a second plurality of scrambling coefficients; and
wherein the original signal is scrambled at every OFDM tone in every OFDM symbol of the first set of bandwidth resource with a corresponding scrambling coefficient of the first plurality of scrambling coefficients to generate the first scrambled OFDM signal and the original signal is scrambled at every OFDM tone in every OFDM symbol of the second set of bandwidth resource with a corresponding scrambling coefficient of the second plurality of scrambling coefficients to generate the second scrambled OFDM signal.

71. The apparatus of claim 70, wherein a first coefficient in the first plurality of scrambling coefficients that are used to scramble the original signal at an OFDM tone in an OFDM symbol of the first set of bandwidth resource and a second coefficient in the second plurality of scrambling coefficients that are used to scramble the same original signal at a corresponding OFDM tone in a corresponding OFDM symbol of the second set of bandwidth resource are such that a sum of squares of amplitudes of the first and second coefficients are constant for all the OFDM tones and symbols in the first and second sets of bandwidth resource.

72. The apparatus of claim 71, the first and second coefficients have the same amplitude.

* * * * *